US010861138B2

(12) United States Patent
Chiba et al.

(10) Patent No.: US 10,861,138 B2
(45) Date of Patent: Dec. 8, 2020

(54) IMAGE PROCESSING DEVICE, IMAGE PROCESSING METHOD, AND PROGRAM

(71) Applicant: Rakuten, Inc., Tokyo (JP)

(72) Inventors: Naoki Chiba, Tokyo (JP); Xingji Zeng, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 302 days.

(21) Appl. No.: 15/751,469

(22) PCT Filed: Jul. 13, 2016

(86) PCT No.: PCT/JP2016/070751
§ 371 (c)(1),
(2) Date: Feb. 8, 2018

(87) PCT Pub. No.: WO2018/011930
PCT Pub. Date: Jan. 18, 2018

(65) Prior Publication Data
US 2018/0232865 A1 Aug. 16, 2018

(51) Int. Cl.
G06T 5/00 (2006.01)
G06T 7/90 (2017.01)
G06T 3/40 (2006.01)
G06T 5/50 (2006.01)

(52) U.S. Cl.
CPC ............. *G06T 5/005* (2013.01); *G06T 3/40* (2013.01); *G06T 5/50* (2013.01); *G06T 7/90* (2017.01); *G06T 2207/10024* (2013.01); *G06T 2207/20221* (2013.01)

(58) Field of Classification Search
CPC combination set(s) only.
See application file for complete search history.

(56) References Cited

U.S. PATENT DOCUMENTS 6,738,532 B1 * 5/2004 Oldroyd ............... G06K 9/6203
345/634
7,613,362 B1 * 11/2009 Schroeder ................ G06T 7/32
382/276
2007/0024738 A1 * 2/2007 Kanai ................ H04N 5/23212
348/335

(Continued)

OTHER PUBLICATIONS

Zeng et al. "Shadow Elimination for Constructing Virtual Environments", Jan. 22, 2016, Information Processing Society of Japan (Year: 2016).*

(Continued)

*Primary Examiner* — Zhiyu Lu
(74) *Attorney, Agent, or Firm* — HEA Law PLLC

(57) ABSTRACT

An image processing device is configured to: acquire a first image photographed from a first position; acquire a second image photographed from a second position; identify an edit target area where a first shadow or a first shielding object is shown in the first image; decrease a resolution of the second image so as to match with a photographed object shown in the first image, and identifying a photographed part area where a second shadowed part or a second shielded part is shown in a low-resolution second image; identify a similar area in at least one of the first image and the second image, the similar area being similar to the photographed part area; and edit the edit target area in the first image, based on the similar area.

13 Claims, 16 Drawing Sheets

(56) References Cited

U.S. PATENT DOCUMENTS

| | | | | |
|---|---|---|---|---|
| 2009/0252374 | A1* | 10/2009 | Ishikawa | H04N 5/144 382/103 |
| 2009/0303338 | A1* | 12/2009 | Chaurasia | H04N 5/2624 348/222.1 |
| 2011/0200259 | A1* | 8/2011 | Lindskog | G06T 5/005 382/201 |
| 2013/0202163 | A1* | 8/2013 | Shimada | G06K 9/00268 382/118 |
| 2014/0085473 | A1* | 3/2014 | Donishi | H04N 5/235 348/148 |
| 2014/0177975 | A1* | 6/2014 | Lindskob | G06T 11/00 382/282 |
| 2014/0184852 | A1* | 7/2014 | Niemi | H04N 5/2356 348/239 |
| 2014/0218353 | A1* | 8/2014 | Solem | G06T 7/30 345/419 |
| 2016/0180201 | A1* | 6/2016 | Aubert | G06K 9/00785 382/190 |
| 2018/0150949 | A1* | 5/2018 | Matono | G01C 3/06 |

OTHER PUBLICATIONS http://research.microsoft.com/pubs/69211/siggraph05_0265_final.pdf.

* cited by examiner

FIG. 7
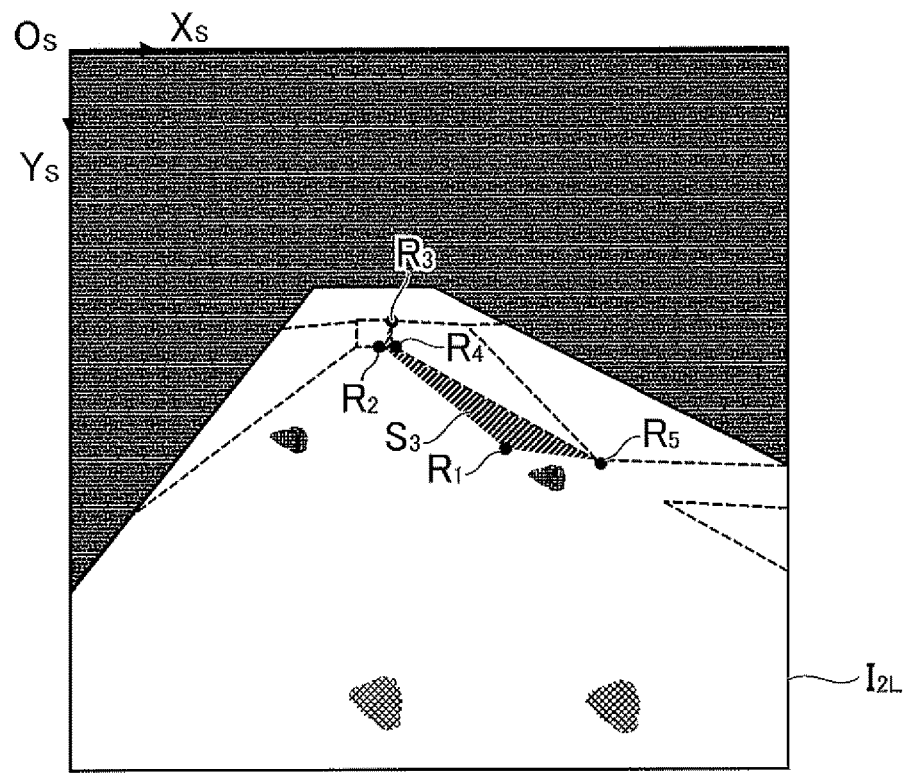
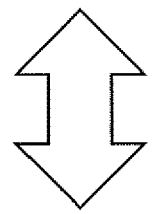
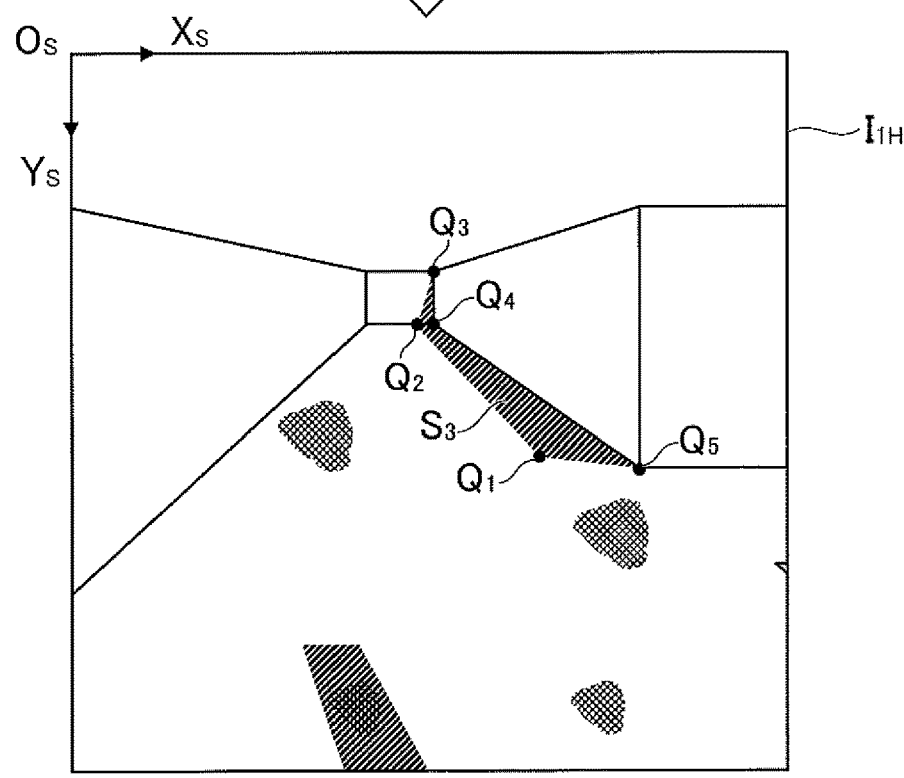

IMAGE PROCESSING DEVICE, IMAGE PROCESSING METHOD, AND PROGRAM

CROSS REFERENCE TO RELATED APPLICATIONS

This application is a National Stage of International Application No. PCT/JP2016/070751 filed on Jul. 13, 2016. The contents of the above document is incorporated herein by reference in its entirety.

TECHNICAL FIELD

The present invention relates to an image processing device, an image processing method, and a program.

BACKGROUND ART

Conventionally, a technology for eliminating a shadow or a shielding object shown in an image obtained by photographing in a space on a camera has been studied. For example, Patent Literature 1 discloses a technology for eliminating, when a part of photographed objects is shielded by a shielding object, the shielding object from the image, based on a pattern around the shielding object to thereby restore the part shielded by the shielding object.

CITATION LIST

Non-Patent Literature

Non-Patent Literature 1:
http://research.microsoft.com/pubs/69211/siggraph05_0265_final .pdf

SUMMARY OF INVENTION

Technical Problem

However, even use of the technology disclosed in Non-Patent Literature 1 may not be able to improve the accuracy in restoration as a pattern similar to the pattern of the part shielded by the shielding object may not be always shown near the part.

Regarding this point, the inventors of the present invention have secretly and uniquely studied to improve the accuracy in restoration when a shadow or a shielding object is shown in a first image by utilizing a second image photographed from a position from where that part can be seen. However, in this case, as the first image and the second image are photographed from different positions, the photographed objects appears differently in the first image and the second image. In view of the above, the inventors consider that simple pasting of the part shown in the second image on the first image cannot improve the accuracy. For example, in the case where the second image is photographed from a position farther than the position from where the first image is photographed or the second image is photographed at a different angle from the angle of the first image, the part in the second image requires enlargement or deformation to match with the first image. In this case, the resolution may decrease, for example, due to the editing applied to the part in the second image. This results in only the part pasted on the first image shown at a lower resolution, which makes the first image appearing unnatural.

The present invention has been conceived in view of the above, and the object of the present invention is to improve the accuracy in restoration of an image in which a shadow or a shielding object is shown.

Solution to Problem

In order to achieve the above described object, an image processing device according to the present invention includes a first image acquiring unit for acquiring a first image photographed from a first position and showing a picture in which there is a shadow or a shielding object in a part of a space; a second image acquiring unit for acquiring a second image photographed from a second position farther from a shadow part or a shielded part in the space shown in the first image than the first position and showing the shadow part or the shielded part, an edit target area identifying unit for identifying an edit target area where the shadow or the shielding object is shown in the first image; a photographed part area identifying unit for decreasing the resolution of the second image so as to match with photographed objects shown in the first image, and identifying a photographed part area where the shadowed part or the shielded part is shown in a low-resolution second image; a similar area identifying unit for identifying a similar area in at least one of the first image and the second image, the similar area being similar to the photographed part area; and an editing unit for editing the edit target area in the first image, based on the similar area.

An image processing method according to the present invention includes a first image acquiring step of acquiring a first image photographed from a first position and showing a picture in which there is a shadow or a shielding object in a part of a space; a second image acquiring step of acquiring a second image photographed from a second position farther from a shadow part or a shielded part in the space shown in the first image than the first position and showing the shadow part or the shielded part, an edit target area identifying step of identifying an edit target area in the first image where the shadow or the shielding object is shown; a photographed part area identifying step of decreasing a resolution of the second image so as to match with photographed objects shown in the first image, and identifying a photographed part area where the shadowed part or the shielded part is shown in a low-re solution second image; a similar area identifying step of identifying a similar area in at least one of the first image and the second image, the similar area being similar to the photographed part area; and edit step of editing the edit target area in the first image, based on the similar area.

A program according to the present invention causes a computer to function as a first image acquiring unit for acquiring a first image photographed from a first position and showing a picture in which there is a shadow or a shielding object in a part of a space; a second image acquiring unit for acquiring a second image photographed from a second position farther from a shadow part or a shielded part in the space shown in the first image than the first position and showing the shadow part or the shielded part; an edit target area identifying unit for identifying an edit target area where the shadow or the shielding object is shown in the first image;

a photographed part area identifying unit for decreasing a resolution of the second image so as to match with photographed objects shown in the first image, and identifying a photographed part area where the shadowed part or the shielded part is shown in a low-resolution second image; a similar area identifying unit for identifying a similar area in at least one of the first image and the second image, the similar area being similar to the photographed part area; and an editing unit for editing the edit target area in the first image, based on the similar area.

An information storage medium according to the present invention is a computer readable information storage medium storing the above described program.

In one embodiment of the present invention, the similar area identifying unit may decrease the resolution of the first image so as to coincide with the resolution of the low-resolution second image, and identifies an area in a low-resolution first image similar to the photographed part area as the similar area.

In one embodiment of the present invention, the editing unit may edit, based on the pixel values of the similar area in the first image of which resolution is yet to be decreased.

In one embodiment of the present invention, the similar area identifying unit may identify a similar area similar to the photographed part area and a surrounding area including the shadow or the shielding object in the first image.

In one embodiment of the present invention, the image processing device may further include a surrounding similar area identifying unit for identifying a surrounding similar area in at least one of the first image and the second image, the surrounding similar area being similar to a surrounding area including the shadow or the shielding object in the first image, and the editing unit may edit based further on the surrounding similar area.

In one embodiment of the present invention, the image processing device may further include an estimation unit for estimating the shadow part or the shielded part in the space, based on the condition around the shadow or the shielding object that is translucent shown in the first image, and the editing unit may edit, based further on the result of estimation by the estimation unit.

In one embodiment of the present invention, the image processing device may further include an estimation unit for estimating the shadow part or the shielded part in the space, based on the condition around the shadow or the shielding object that is translucent shown in the first image, and a surrounding area acquiring unit for acquiring the surrounding area, based on the result of estimation by the estimation unit.

In one embodiment of the present invention, the edit target area may include a plurality of edit target small areas, the photographed part area identifying unit may identify a plurality of photographed part areas corresponding to the plurality of respective edit target small areas, the similar area identifying unit may identify a plurality of similar areas similar to the plurality of respective photographed part areas, and the editing unit may edit each of the plurality of edit target small areas, based on the similar area similar to a corresponding photographed part area.

In one embodiment of the present invention, the edit target small area may correspond to a pixel or a plurality of pixels for showing the shadow or the shielding object in the first image.

Advantageous Effects of Invention

According to the present invention, the accuracy in restoration of an image showing a shadow or a shielding object can be improved.

BRIEF DESCRIPTION OF DRAWINGS

FIG. 7 is a diagram showing one example of a second image edited.

DESCRIPTION OF EMBODIMENTS

The following describes an example of an embodiment of an image processing device according to the present invention. An image processing device is a computer capable of image processing, for example, a personal computer, a server computer, a personal digital assistant (including a tablet computer), or a portable phone (a smart phone).

[1. Hardware Structure of Image Processing Device]

Figure 1:
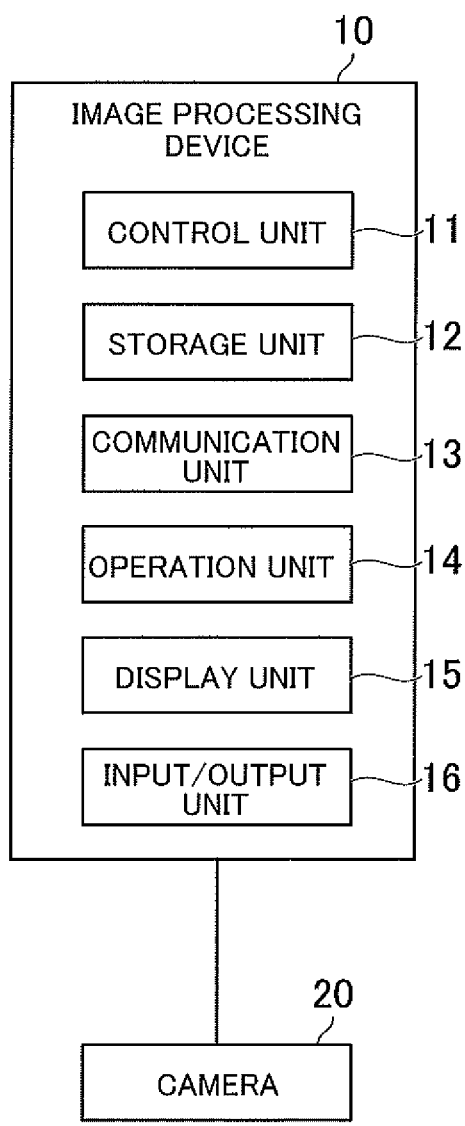
FIG. 1 is a diagram showing the hardware structure of an image processing device.

FIG. 1 shows the hardware structure of an image processing device. As shown in FIG. 1, an image processing device 10 includes a control unit 11, a storage unit 12, a communication unit 13, an operation unit 14, a display unit 15, and an input/output unit 16.

The control unit 11 includes, for example, one or more microprocessors, and executes processing according to a program and data stored in the storage unit 12. The storage unit 12 includes a main storage unit and an auxiliary storage unit. For example, the main storage unit is a volatile memory, such as a RAM, while the auxiliary storage unit is a nonvolatile memory, such as a hard disk or a flash memory. The communication unit 13 is a communication interface for wired or radio communication, and executes data communication via a network.

The operation unit 14 is an input device for operation by a user, and is, for example, a pointing device, such as a touch panel or a mouse, or a keyboard. The operation unit 14 transmits the content of operation by a user to the control unit 11. The display unit 15 is a liquid crystal display unit or an organic EL display unit, for example, and displays a screen image, following an instruction from the control unit 11. The input/output unit 16 is an input/output interface, for example, an USB port, and used for data communication with an external device. For example, the input/output unit 16 is connectable to a camera 20 and may load an image.

The camera 20 is a typical image capturing device capable of capturing a static image and/or a motion picture, and includes, for example, an imager device, such as a CMOS image sensor or a CCD image sensor. The camera 20 generates an image captured by an imager device and stores data on the image in a memory. The memory may be a built-in memory of the camera 20 or a removable flash memory, or the like. The camera 20 may have a wide-angle lens or a fish-eye lens. The angle of view or the focal distance may be set as desired. For example, the camera 20 may be an omnidirectional camera or a camera having a plurality of lenses to capture an all-round image in at least one of the horizontal and vertical directions.

Note that the program and data, described here as stored in the storage unit 12, may be supplied via a network. The hardware structure of the image processing device 10 is not limited to the above described example, and various types of hardware are applicable. For example, the image processing device 10 may include a reading unit (for example, an optical disk drive or a memory card slot) for reading a computer readable information storage medium. For example, the reading unit or the input/output unit 16 may read the program and data stored in an information storage medium and supply to the image processing device 10.

[2. Summary of Processing Executed by Image Processing Device]

The following outlines the processing executed by the image processing device 10. In this embodiment, a user captures an image on the camera 20 while moving in a space, for example, to thereby generate a plurality of images captured at a plurality of respective positions. The space is a place on the earth, which can be photographed objects of the camera 20 and where a plurality of photographed objects are disposed.

Figure 2:
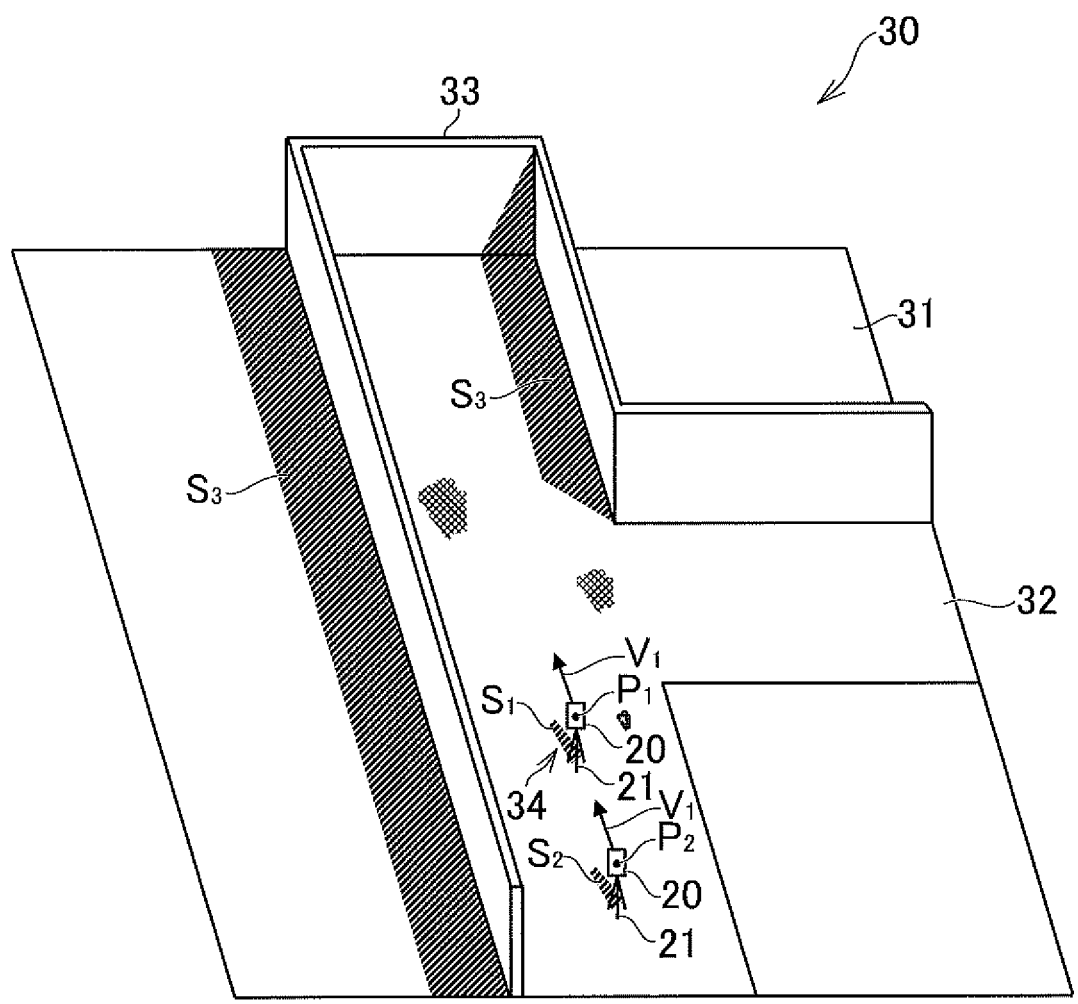
FIG. 2 is a diagram showing a situation in which an image is captured on a camera in a space.

FIG. 2 shows a situation in which the camera 20 is capturing an image in the space. As shown in FIG. 2, for example, a road 32 and a wall 33 are disposed on a ground surface 31 in the space 30. A user takes pictures on the camera 20 that is fixedly mounted on a tripod 21 placed on the road 32. A case will be described here in which a user takes pictures at a first position $P_1$ and a second position $P_2$, although a user may take pictures at three or more positions. The photographing direction $V_1$ at the first position $P_1$ is assumed the same as the photographing direction $V_1$ at the second position $P_2$ here for brevity of description, although the photographing direction $V_1$ may differ front the photographing direction $V_2$.

The sun is assumed located behind the camera 20 in this embodiment. This results in the shadow $S_1$ of the camera 20 and the tripod 21 formed extending forward when a picture is taken at the first position $P_1$, and the shadow $S_2$ of the camera 20 and the tripod 21 formed extending forward when a picture is taken at the second position $P_2$, as shown in FIG. 2. The shadow $S_3$ of the wall 33 as well is formed on the ground surface 31. Although the shadows $S_1$ and $S_2$ are both shown in FIG. 2 for convenience in description, actually, the shadows $S_2$ is not formed when a picture is taken at the first position $P_1$, and the shadow $S_1$ is not formed when a picture is taken at the second position $P_2$.

Figure 3:
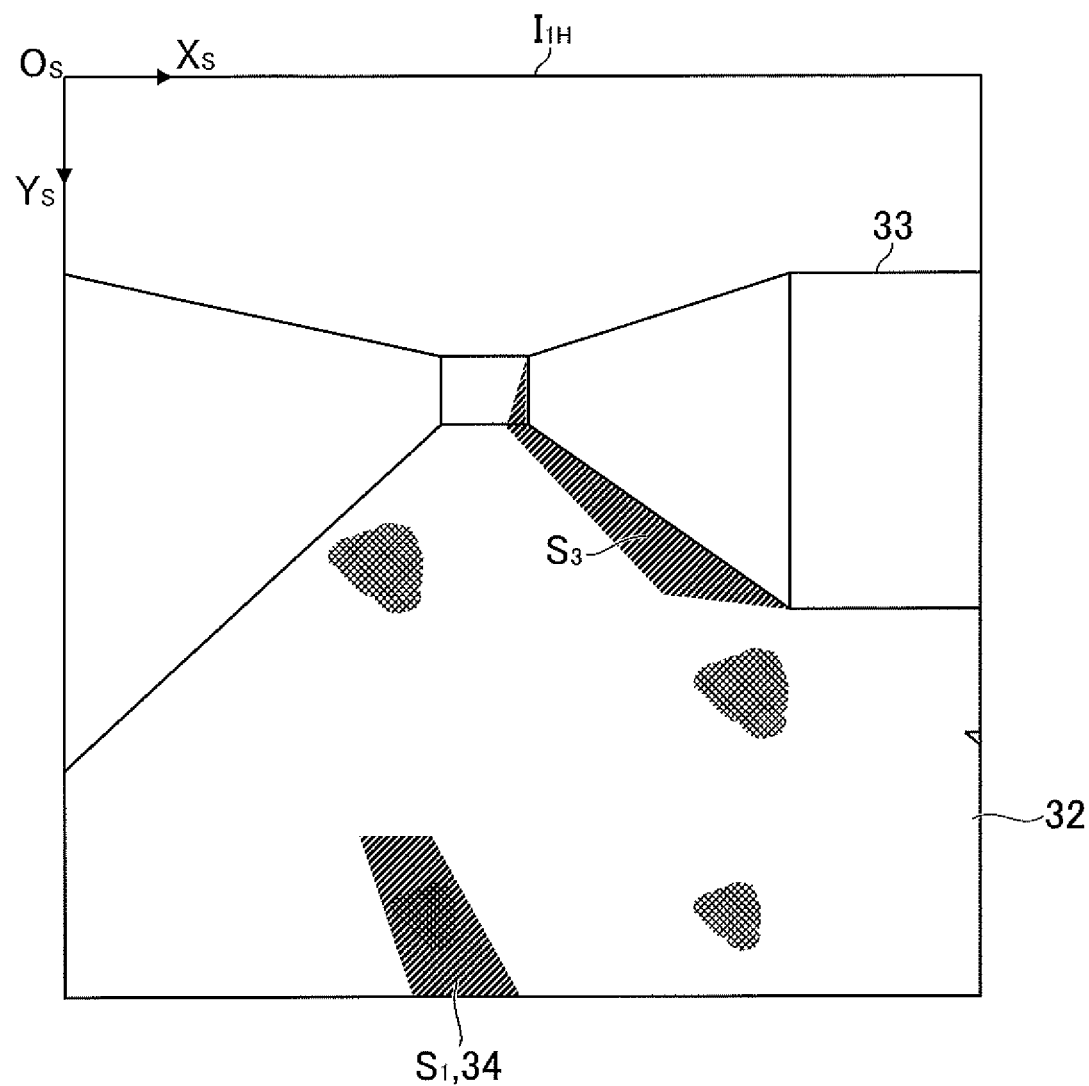
FIG. 3 is a diagram showing one example of a first image captured at a first position.
Figure 4:
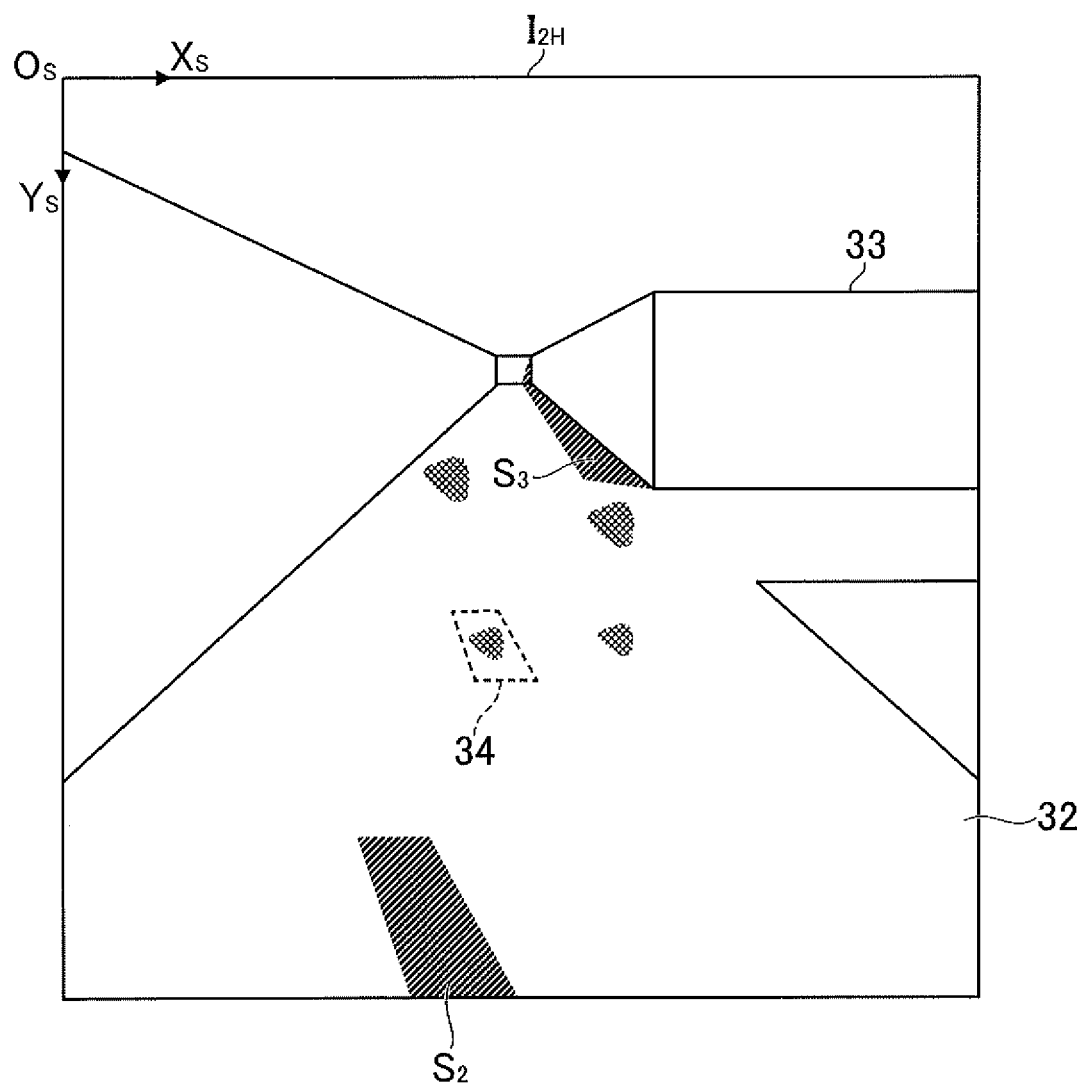
FIG. 4 is a diagram showing one example of a second image captured at a second position.

FIG. 3 shows one example of a first image captured at the first position $P_1$; FIG. 4 shows one example of a second image captured at the second position $P_2$. Screen coordinate axes (the $X_s$ and $Y_s$ axes) are defined with the origin $O_s$ set at the upper left corner of an image, and the position of a pixel in the image is indicated in two dimensional (2D) coordinates. The first image $I_{1H}$ and the second image $I_{2H}$ have the same size and are both square here.

As shown in FIGS. 3 and 4, the shadow $S_1$ is shown in the first image $I_{1H}$, and the shadow $S_2$ is shown in the second image $I_{2H}$. As the shadow $S_1$ is not formed when the second image $I_{2H}$ is captured, as described above, a part of the space 30 where the shadow $S_1$ is formed in the first image $I_{1H}$ (that is a part of the road 32 here, and will be hereinafter referred to as a shadow part 34) is not darkened by a shadow but shown bright in the second image $I_{2H}$. This makes the rarely seeable details of the shadow part 34 due to the shadow $S_1$ in the first image $I_{1H}$ clearly seen in the second image $I_{2H}$.

However, although the shadow part 34 is barely recognizable in the second image $I_{2H}$, the inventors consider it not possible to sufficiently improve the accuracy in restoration as the shadow part 34 in the second image $I_{2H}$ needs enlargement or deformation, as described above. Meanwhile, it is possible that details similar to those of the shadow part 34 are shown in the first image $I_{1H}$, where other parts of the road 32 are shown. Thus, in this embodiment, an area similar to the shadow part 34 is detected in the first image $I_{1H}$ to change the color of the shadow $S_1$ shown in the first image $I_{1H}$, based on that area. Details of this technology will be described below.

[3. Functions Implemented in Image Processing Device]

Figure 5:
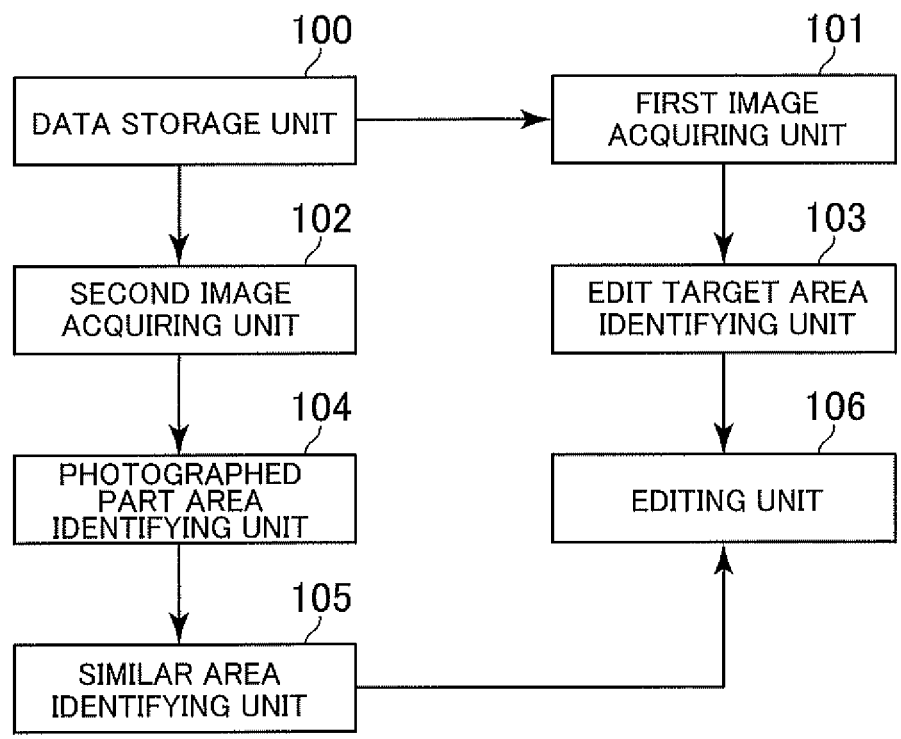
FIG. 5 is a functional block diagram showing one example of the functions implemented in an image processing device.

FIG. 5 is a functional block diagram showing one example of the functions implemented in the image processing device 10. A case will be described in this embodiment in which a data storage unit 100, a first image acquiring unit 101, a second image acquiring unit 102, an edit target area identifying unit 103, a photographed part area identifying unit 104, a similar area identifying unit 105, and an editing unit 106 are implemented in the image processing device 10, as shown in FIG. 5.

[3-1. Data Storage Unit]

The data storage unit 100 is implemented using mainly the storage unit 12. The data storage unit 100 stores an image (a photograph) captured on the camera 20. The aspect ratio, size, and resolution, number of colors (the number of bits in a color image), and data format of an image are common to a plurality of images in this embodiment, although these may be different among respective images. The data storage unit 100 stores a plurality of images photographed from different positions.

Although a case is described in this embodiment in which an image is stored in the data storage unit 100, an image may be stored in other devices or computers, for example, in a memory of the camera 20 or in a server computer. That is, the first image acquiring unit 101 and the second image acquiring unit 102 may acquire an image from other than the data storage unit 100.

[3-2. First Image Acquiring Unit]

The first image acquiring unit 101 is implemented using mainly the control unit 11. The first image acquiring unit 101 in this embodiment acquires the first image $I_{1H}$ photographed at the first position $P_1$ and showing a picture in which the shadow $S_1$ is formed in a part of the space 30. For example, the first image acquiring unit 101 acquires the first image $I_{1H}$ stored in the data storage unit 100.

The first image $I_{1H}$ is an image photographed with the shadow $S_1$ formed on the shadow part 34, or a part of the space 30. The shadow part 34 is a part where the shadow $S_1$ is formed at the time of photographing the first image $I_{1H}$, as described above. In other words, the shadow part 34 is a part of photographed objects shown in the first image $I_{1H}$, the part appearing dark due to the shadow $S_1$. In this embodiment, the shadow part 34 is a part of the road 32 where the shadow $S_1$ of the camera 20 and the tripod 21 is formed at the time of photographing the first image $I_{1H}$.

[3-3. Second Image Acquiring Unit]

The second image acquiring unit 102 is implemented using mainly the control unit 11. The second image acquiring unit 102 acquires the second image $I_{2H}$ photographed from the second position $P_2$ and showing the shadow part 34 in the space 30 shown in the first image $I_{1H}$. In this embodiment, the second image acquiring unit 102 acquires the second image $I_{2H}$ captured at the second position $P_2$ farther from the shadow part 34 in the space 30 shown in the first image $I_{1H}$ than the first position $P_1$ and showing the shadow part 34. For example, the second image acquiring unit 102 acquires the second image $I_{2H}$ stored in the data storage unit 100.

The second image is photographed with no shadow formed on the shadow part 34. That is, light is hitting the shadow part 34 when the second image $I_{2H}$ is photographed. Note that total absence of a shadow on the shadow part 34 in the second image $I_{2H}$ is not indispensable. The shadow part 34 may be slightly shadowed in the second image $I_{2H}$ if appearing clearer than that in the first image $I_{1H}$. Also, in this embodiment, the shadow part 34 appears smaller in the second image $I_{2H}$ than in the first image $I_{1H}$ as the second position $P_2$ is farther from the shadow part 34 than the first position $P_1$, as shown in FIG. 2. Similarly, the road 32 and the wall 33 shown in the first image $I_{1H}$ appear smaller in the second image $I_{2H}$ than in the first image $I_{1H}$.

[3-4. Edit Target Area Identifying Unit]

The edit target area identifying unit 103 is implemented using mainly the control unit 11. The edit target area identifying unit 103 identifies an edit target area where the shadow $S_1$ is shown in the first image $I_{1H}$.

The edit target area is an area containing at least a part or the entirety of the shadow $S_1$, and can be described as an area to be edited by the editing unit 106. The edit target area may contain only pixels for showing the shadow $S_1$ or pixels for showing the shadow $S_1$ and pixels around those pixels. A case will be described here in which an edit target area contains only pixels for showing the shadow $S_1$. Meanwhile, an edit target area containing pixels for showing the shadow $S_1$ and pixels around those pixels may be defined as an area containing pixels within a predetermined distance from the contour of the shadow $S_1$ or an area having a predetermined shape and a predetermined size.

The edit target area in this embodiment includes a plurality of edit target small areas, although the edit target area may not be divided into a plurality of areas. The edit target small area makes a search unit in a search for a similar area to be described later. The edit target small area includes at least one of all pixels for showing the shadow $S_1$, for example. A case will be described in this embodiment in which an edit target small area corresponds to each of the pixels for showing the shadow $S_1$ in the first image $I_{1H}$, although an edit target small area may correspond to a plurality of pixels for showing the shadow $S_1$. When the shadow $S_1$, or an edit target area, is shown using the n number of pixels (n being a positive integer and indicating the total number of pixels for showing an edit target area), there are the n number of edit target small areas.

Figure 6:
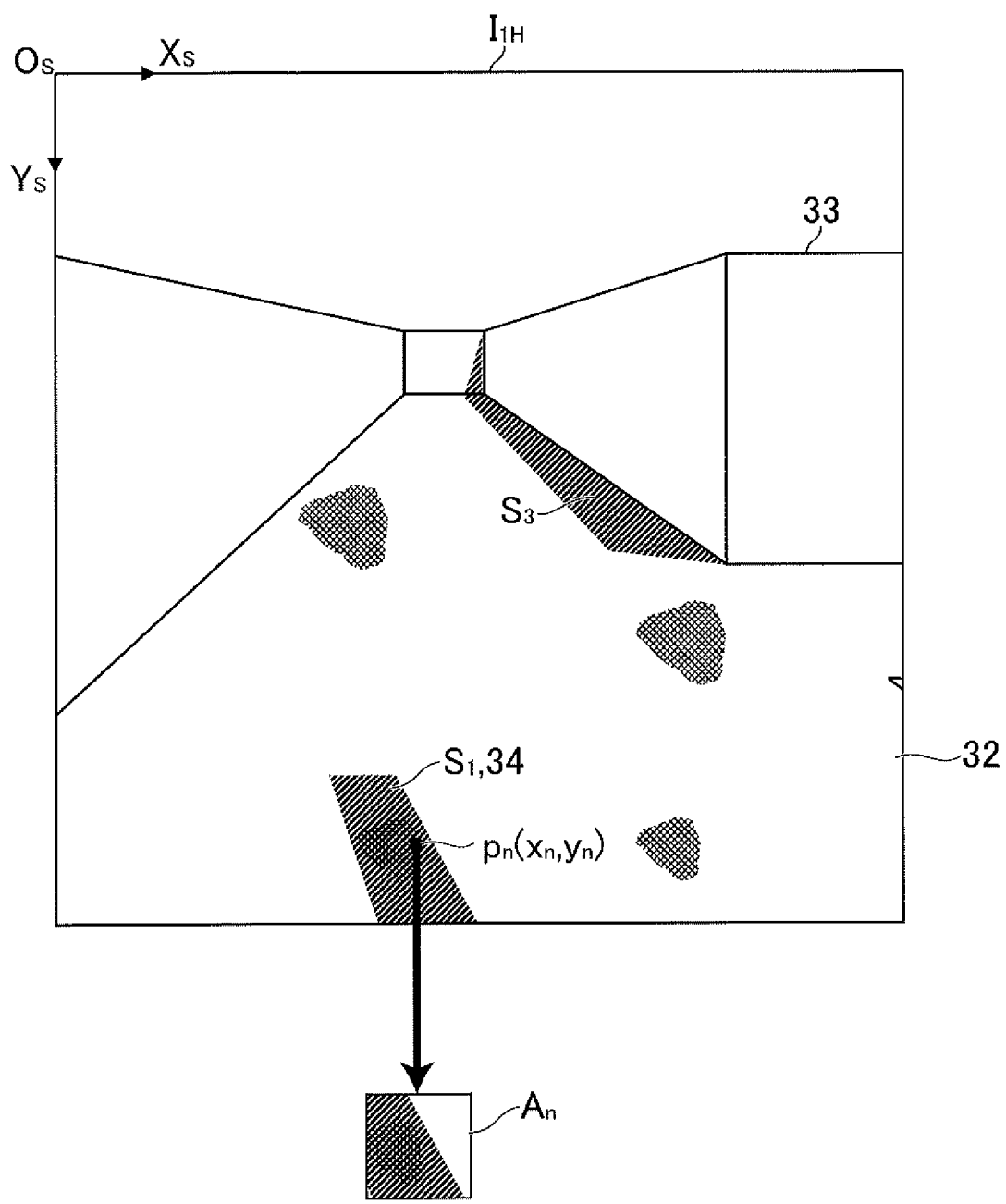
FIG. 6 is a diagram showing an edit target area and an edit target small area.

FIG. 6 shows the edit target area and the edit target small area. In this embodiment, as the edit target area is the shadow $S_1$, as described above, each edit target small area corresponds to each pixel $p_n$ ($x_n$, $y_n$) of the pixels for showing the shadow $S_1$, as shown in FIG. 6. Note that ($x_n$, $y_n$) is 2D coordinates that identify a pixel. In this embodiment, for every pixel $p_n$ ($x_n$, $y_n$), a surrounding area $A_n$ having a predetermined size and containing the pixel $p_n$ ($x_n$, $y_n$) is set. That is, the surrounding area $A_n$ is a square having a predetermined size and containing the pixel $p_n$ ($x_n$, $y_n$) as the center point thereof. In this embodiment, the surrounding area $A_n$ is used to identify a photographed part area to be described later. Although only one surrounding area $A_n$ is shown in FIG. 6, there are the same number of surrounding areas An as the number (that is, n) of the edit target small areas.

The edit target area identifying unit 103 may identify an edit target area, based on operation by a user or image analysis. For example, to identify an edit target area based on operation by a user, the edit target area identifying unit 103 displays the first image $I_{1H}$ on the display unit 15 to receive operation by a user. For example, a user selects an area showing the shadow $S_1$ by operating the operation unit 14. An operation for selecting an area may be an area selection operation employed for typical paint software, for example, an operation of tracing the contour of, or an area near, the shadow $S_1$ with a cursor, by using a pointing device. The edit target area identifying unit 103 identifies an edit target area, based on the area selected by a user.

Meanwhile, for example, to identify an edit target area, based on image analysis, the edit target area identifying unit 103 executes template matching using a template image exhibiting a basic pattern of the shadow $S_1$ to identify the shadow $S_1$ and thus an edit target area. Alternatively, for example, as the shadow $S_1$ has a predetermined color (for example, black, dark blue, or gray), the edit target area identifying unit 103 may execute edge detection processing relative to the first image $I_{1H}$ to extract an area (that is, an area solidly colored in a single color or similar colors) and then identify an area having a predetermined color inside the extracted area as an edit target area. As the algorithm itself for identifying the shadow, various publicly known shadow detection algorithms are applicable. The edit target area identifying unit 103 may identify an edit target area, based on an area detected, using a shadow detection algorithm.

Note that as the first image $I_{1H}$ includes a shadow (for example, the shadow $S_3$ of the wall 33) other than the shadow $S_1$ of the tripod 21 of the camera 20, the edit target area identifying unit 103 may set only a predetermined area (for example, the lower half of the image or a part near the middle of an image) in the first image $I_{1H}$ as a target to be searched in a search for an edit target area. That is, when the position of the edit target area is predictable, an area to be searched may be narrowed, as described above, to thereby reduce a processing load of the image processing device 10 and promptly identify an edit target area.

[3-5. Photographed Part Area Identifying Unit]

The photographed part area identifying unit 104 is implemented using mainly the control unit 11. The photographed part area identifying unit 104 identifies a photographed part area showing the shadow part 34 in the space 30, based on the second image $I_{2H}$. Although a case will be described in this embodiment in which the photographed part area identifying unit 104 edits the second image $I_{2H}$ to identify a photographed part area therein, the photographed part area identifying unit 104 may not edit the second image $I_{2H}$ to identify a photographed part area therein.

The photographed part area is a partial image showing the shadow part 34. In other words, the photographed part area is a partial image showing the shadow part 34 clearer or brighter than in the first image $I_{1H}$. In this embodiment, the photographed part area is a part of an image captured with no shadow formed on the shadow part 34 in the space 30.

For example, when the second image $I_{2H}$ is photographed at a time rarely different from the time when the first image $I_{2H}$ is photographed, as the positional relationship between the wall 33 and the sun is rarely changed, the shape of the shadow $S_3$ formed on the road 32 is rarely changed. With this point focused, in this embodiment, the photographed part area identifying unit 104 edits the second image $I_{2H}$ so as to match with the shape of the shadow $S_3$ shown in the first image $I_{1H}$. This editing of the second image $I_{2H}$ is made in order to identify pixels in the second image $I_{2H}$ that correspond to the pixels for showing the shadow $S_1$ in the first image $I_{1H}$. Note that "to edit" means various image editing processing, such as enlargement, size-reduction, deformation, perspective conversion, projection conversion, resolution change, or cropping.

Specifically, the photographed part area identifying unit 104 initially identifies the shadow $S_3$ shown in the first image $I_{1H}$ and the shadow $S_3$ shown in the second image $I_{2H}$, using a known shadow detection algorithm or a contour extraction algorithm, and then extracts characteristic points of these shadows $S_3$. A characteristic point may be a point indicating a characteristic in shape of the shadow $S_3$. Any point on the contour of the shadow $S_3$, for example, may be used as a characteristic point. A vertex of the shadow $S_3$ is used here as one example of the characteristic point. The photographed part area identifying unit 104 then edits the second image $I_{2H}$, based on the positional relationship between the characteristic points of the shadow $S_3$ in the first image $I_{1H}$ and that in a second image $I_{2L}$.

FIG. 7 shows one example of a second image $I_{2L}$ resulting from editing. Note that as an example of editing, perspective conversion and projection conversion will be described here. Application of perspective conversion and projection conversion usually decreases the resolution of an image. In FIG. 7, a second image $I_{2L}$ at a decreased resolution (a low-resolution second image $I_{2L}$) is schematically indicated by the broken line. Note that, in the drawings of this embodiment, photographed objects drawn by a solid line represents photographed objects at a high resolution, while photographed objects drawn by a broken line represents photographed objects at a low resolution.

As shown in FIG. 7, the photographed part area identifying unit 104 edits the second image $I_{2L}$ such that the difference in 2D coordinates between the characteristic points $Q_1$ to $Q_5$ of the shadow $S_3$ in the first image $I_{1H}$ and the characteristic points $R_1$ to $R_5$ of the shadow $S_3$ in the second image $I_{2L}$ becomes less than a threshold. For example, the photographed part area identifying unit 104 may calculate an evaluation value indicating the amount of displacement between the characteristic points, based on the difference between these 2D coordinates. For example, the photographed part area identifying unit 104 may repetitively execute perspective conversion and projection conversion with respect to the second image $I_{2H}$ until a second image $I_{2L}$ with the amount of displacement, indicated by the evaluation value, less than a threshold is obtained. That is, the photographed part area identifying unit 104 edits the second image $I_{2H}$ such that the shadow $S_3$ shown in the second image $I_{2L}$ matches with the shadow $S_3$ shown in the first image $I_{1H}$.

As described above, the photographed part area identifying unit 104 matches the size and position of the shadow $S_3$ in the second image $I_{2L}$ to those of the shadow $S_3$ in the first image $I_{1H}$. In order to improve the accuracy in size and position matching, the photographed part area identifying unit 104 may apply blurring processing to the parts other than the road 32 in the first image $I_{1H}$ and the second image $I_{2H}$ before executing the above described position and size matching. In this case, as the parts other than the road 32 are made blurred, only the characteristic points of the shadow $S_3$ can be accurately detected. This can improve the accuracy in size and position matching. The part other than the road 32 may be masked, instead of being blurred, to be thereby excluded from a target for characteristic point extraction.

Although the shadow $S_3$ is used as a reference here, any photographed object shown in both the first image $I_{1H}$ and the second image $I_{2H}$ may be used as a reference. That is, size and position matching may be executed using other photographed objects (for example, the road 32 or the wall 33) as a reference. Identification of photographed objects may utilize a publicly known object detection algorithm.

In this embodiment, as the edit target area (the shadow $S_1$ here) includes a plurality of edit target small areas (pixels $p_n$ ($x_n$, $y_n$) for showing the shadow $S_1$ here), as described above, the photographed part area identifying unit 104 identifies a plurality of photographed part areas respectively corresponding to the plurality of edit target small areas. That is, one photographed part area is identified with respect to one edit target area.

Figure 8:
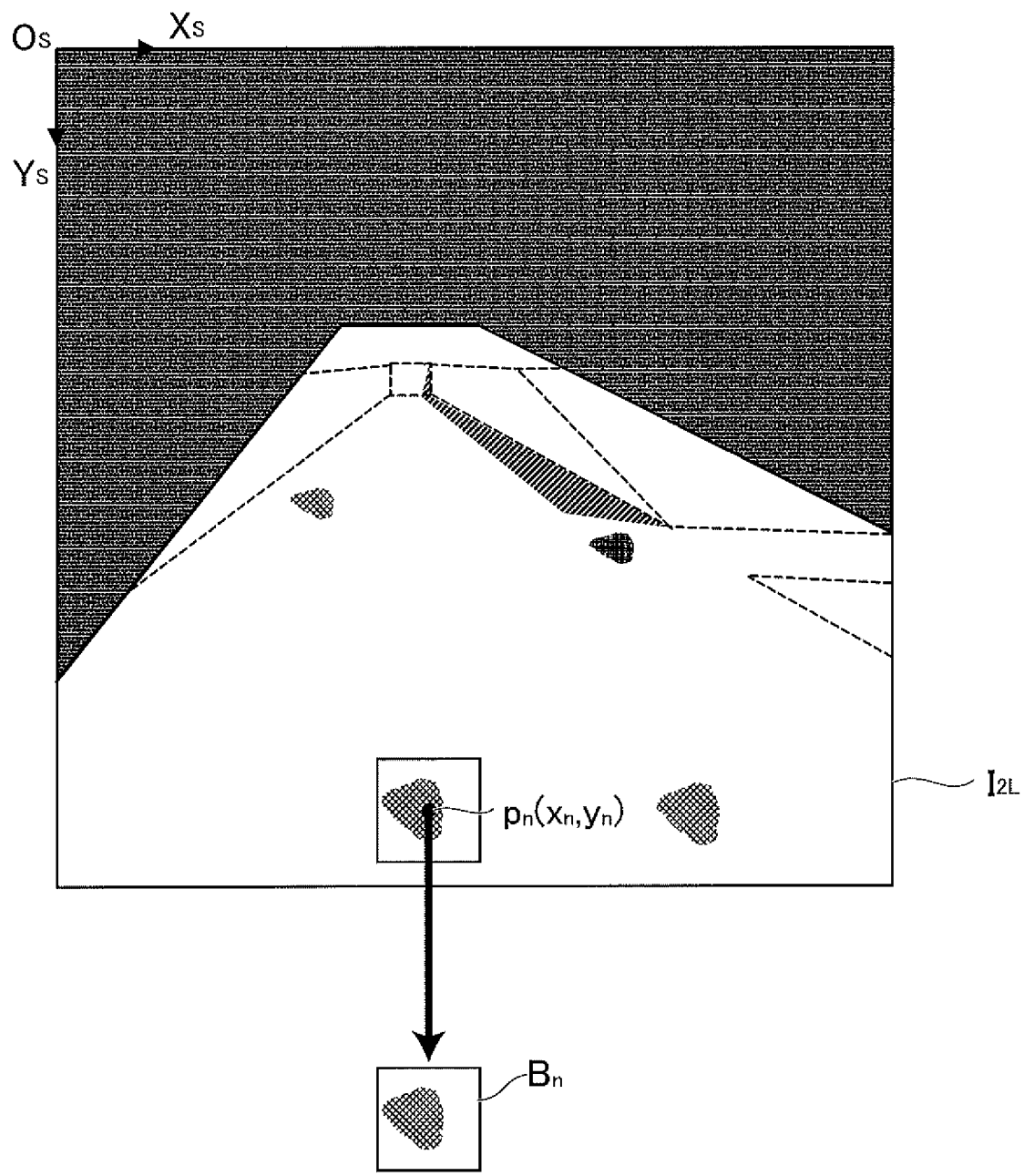
FIG. 8 is a diagram showing a photographed part area.

FIG. 8 shows a photographed part area. As shown in FIG. 8, for example, the photographed part area identifying unit 104 identifies in the low-resolution second image $I_{2L}$ a photographed part area $B_n$, containing a pixel at the same coordinates as those of a pixel $p_n$ ($x_n$, $y_n$) that is an edit target small area. The coordinates may not be exactly the same but may differ slightly. The photographed part area $B_n$ has the same shape and size as those of the surrounding area $A_n$, and is, for example, a square having a predetermined size and containing the pixel $p_n$ ($x_n$, $y_n$) as the center point. The shape and size of the photographed part area $B_n$ may not be necessarily exactly the same as those of the surrounding area $A_n$ but may differ slightly.

In this embodiment, as the second position P is farther from the shadow part 34 in the space 30 than the first position $P_1$, as described above, the photographed part area identifying unit 104 decreases the resolution of the second image $I_{2H}$ so as to match with the photographed objects shown in the first image $I_{1H}$. Then, the photographed part area identifying unit 104 acquires an area showing the shadow part 34 in the low-resolution second image $I_{2L}$, as a photographed part area $B_n$. For example, the photographed part area identifying unit 104 acquires an area in the second image $I_{2L}$ at the same position (2D coordinates) as that of the edit target area in the first image $I_{1H}$ as a photographed part area $B_n$. Thus, the 2D coordinates same as those which are contained in the edit target area are contained in the photographed part area $B_n$.

Although a case has been described above in which image analysis is used to identify a photographed part area $B_n$, the photographed part area identifying unit 104 may use operation by a user to identify a photographed part area $B_n$. In this case, the photographed part area identifying unit 104 shows the second image $I_{2H}$ or the low-resolution second image $I_{2L}$ on the display unit 15 to receive operation by a user, and then identifies an area selected by the user as a photographed part area $B_n$. Alternatively, the photographed part area identifying unit 104 may edit the second image $I_{2H}$ to some extent based on operation by a user, and then adjust based on image analysis such that the low-resolution second image $I_{2L}$ matches with the first image $I_{1H}$.

[3-6. Similar Area. Identifying Unit]

The similar area identifying unit 105 is implemented using mainly the control unit 11. The similar area identifying unit 105 identifies a similar area $C_n$ similar to the photographed part area $B_n$, based on at least one of the first image $I_{1H}$ and the second image $I_{2H}$. Although a case will be described in this embodiment in which the similar area identifying unit 105 identifies a similar area $C_n$ in the first image $I_{1H}$, the similar area identifying unit 105 may identify a similar area $C_n$ in an image obtained by editing the first image $I_{1H}$, the second image $I_{2H}$, or these images, as in modified examples to be described later. A similar area $C_n$ may be searched for not in the entire image but in a part of the image, such as in an area near the middle or a peripheral part of the image.

In this embodiment, as a photographed part area $B_n$ is identified for every pixel $p_n$ ($x_n$, $y_n$) that is an edit target small area, the similar area identifying unit 105 identifies a plurality of similar areas $C_n$ similar to the plurality of respective photographed part areas $B_n$. That is, one similar area $C_n$ is identified with respect to one photographed part area $B_n$. When no edit target small area is set, only one similar area $C_n$ may be identified.

Figure 9:
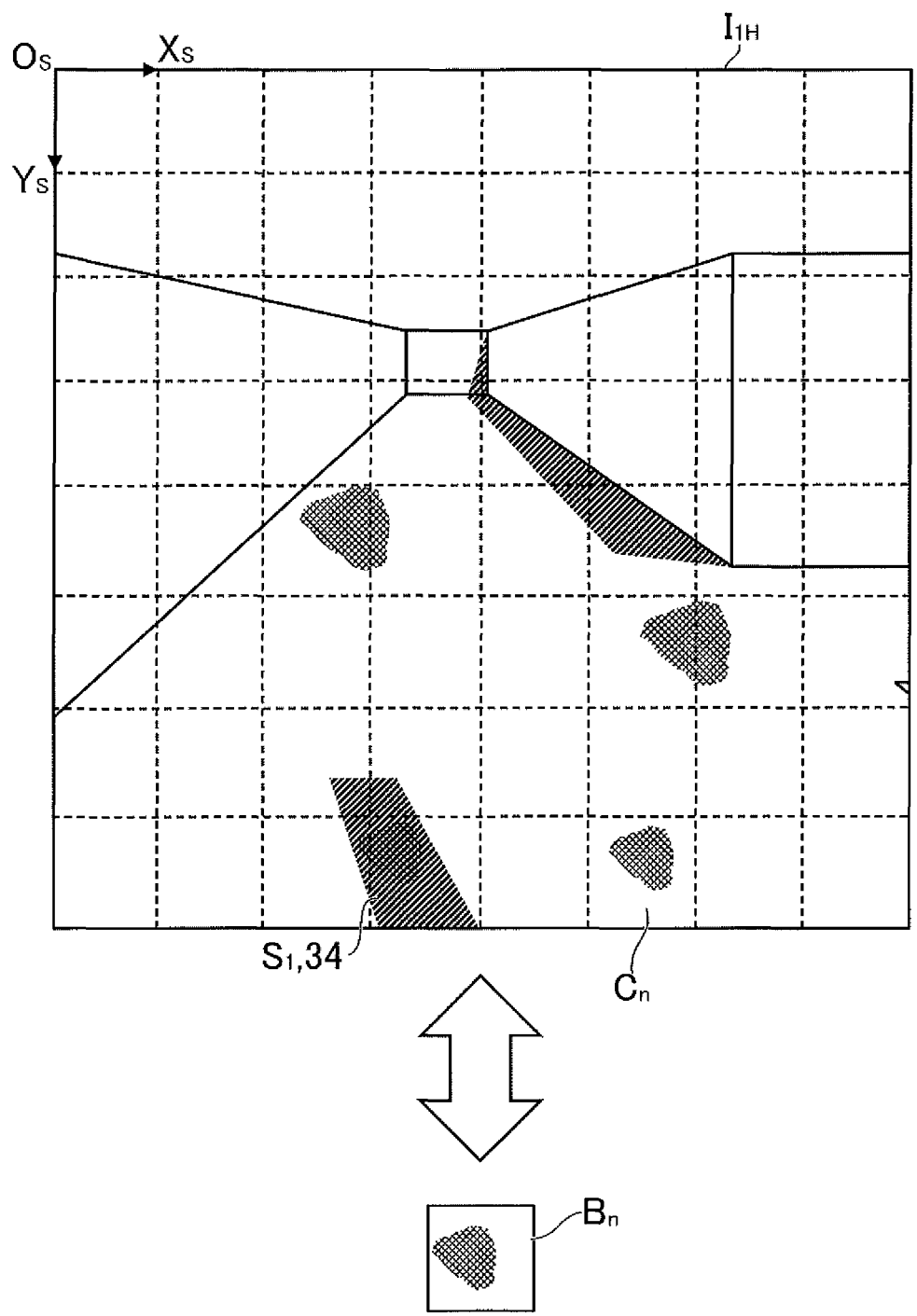
FIG. 9 is a diagram showing a method for identifying a similar area.

FIG. 9 shows an identification method for identifying a similar area. For example, the similar area identifying unit 105 executes template matching, using the photographed part area $B_n$ as a template image, to identify a similar area $C_n$. Specifically, as shown in FIG. 9, the similar area identifying unit 105 divides the first image $I_{1H}$ into a plurality of small areas (sixty-four 8×8 areas separated by the broken lines in FIG. 7) each having a size same as, or similar to, that of the photographed part area $B_n$. Although a relatively large small area is shown here for brevity of description, the first image $I_{1H}$ may be divided into a few hundreds or more of much smaller areas each having a much smaller size. Similarly, the photographed part area $B_n$, may have a much smaller sire, and be divided into a plurality of areas.

Then, the similar area identifying unit 105 calculates an evaluation value indicating similarity, based on pixel values of the pixels included in each small area and pixel values of the pixels included in the photographed part area $B_n$. A pixel value is a value indicating the color of a pixel, being an R value, a G value, and a B value for an RGB color image. A pixel value is referred to also as brightness. For example, the similar area identifying unit 105 may calculate an evaluation value, using the expression 1 below, although calculation of an evaluation value may use any other expression capable of comprehensive evaluation of a difference in pixel value, not limited to the expression 1.

$$E_{H1R} = \Sigma_{i=1}^{m}(X_{1Hi} - X_{Bm})^2 \qquad \text{[Expression 1]}$$

$E_{H1R}$ in the expression 1 indicates an evaluation value; m indicates the total number of pixels in a small area and a photographed part area $B_n$; $X_{1Hi}$ indicates a pixel value of each pixel in the small area; $X_{Bmi}$ indicates a pixel value of each pixel in the photographed part area $B_n$. As the sum of the squares of the difference between these pixel values is used as the evaluation value $E_{H1R}$, a larger evaluation value $E_{H1R}$ means a larger color difference, and a smaller evaluation value $E_{H1R}$ means a smaller color difference. The similar area identifying unit 105 identifies a small area with either the minimum evaluation value $E_{H1R}$ or an evaluation value $E_{H1R}$ less than a threshold as a similar area $C_n$. The above described method for identifying a similar area $C_n$ is one example; various matching methods capable of determining similarity of an image are applicable.

[3-7. Editing unit]

The editing unit 106 is implemented using mainly the control unit 11. The editing unit 106 edits the edit target area in the first image $I_{1H}$, based on the similar area $C_n$. Here, "to edit" means to change the pixel values, that is, a color, in the edit target area.

Figure 10:
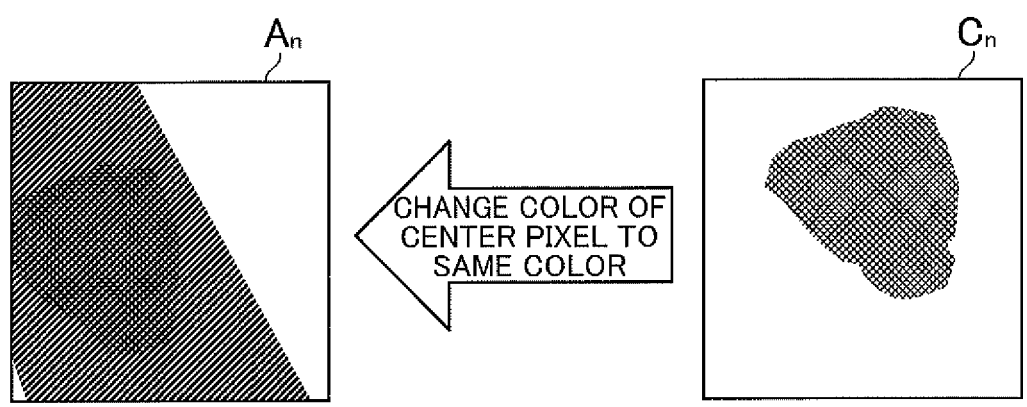
FIG. 10 is a diagram showing an editing method employed by an editing unit.

FIG. 10 shows an editing method employed by the editing unit 106. In this embodiment, as the edit target area (the shadow $S_1$ here) is divided into edit target small areas (a pixel $p_n$ ($x_n$, $y_n$) for the shadow $S_1$ here), the editing unit 106 edits each of the plurality of edit target small areas, based on the similar area $C_n$ similar to the corresponding photographed part area $B_n$.

For example, the editing unit 106 changes the pixel value of the pixel $p_n$ ($x_n$, $y_n$) in the edit target small area in the middle of a surrounding area $A_n$ to the pixel value of a pixel (the center pixel, for example) in the similar area $C_n$. The editing unit 106 repeats this processing at the same number of times as the number of pixels $p_n$ ($x_n$, $y_n$). The editing unit 106 may change the pixel value to a value exactly the same as the pixel value in the similar area $C_n$ or a value close to the pixel value, if not exactly the same.

Figure 11:
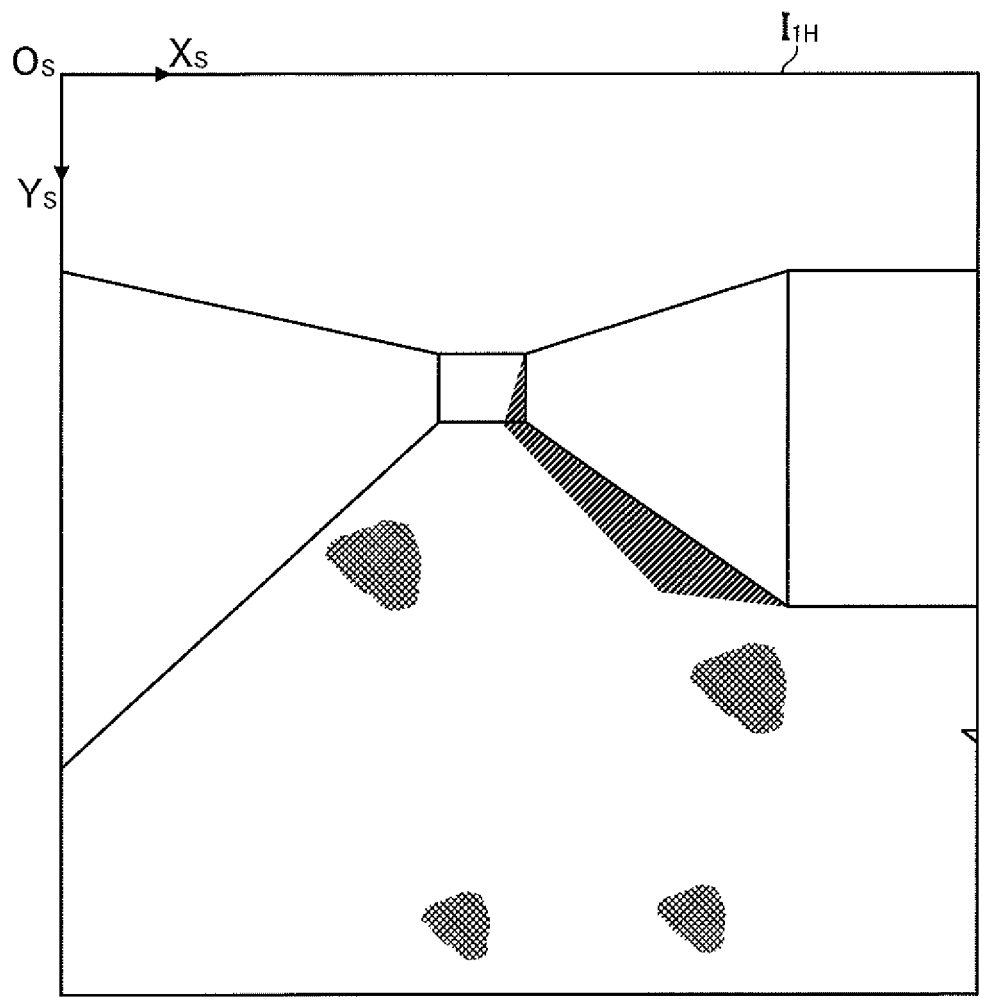
FIG. 11 is a diagram showing a first image edited by an editing unit.

FIG. 11 shows the first image $I_{1H}$ edited by the editing unit 106. As shown in FIG. 11, editing by the editing unit 106 eliminates the shadow $S_1$, or the edit target area, and details same as, or similar to, those of the shadow part 34 are resultantly drawn in the edit target area. The editing unit 106, having changed the color inside the edit target area, may smoothen the color boundary through, for example, poisson blending.

[4. Processing Executed in This Embodiment]

Figure 12:
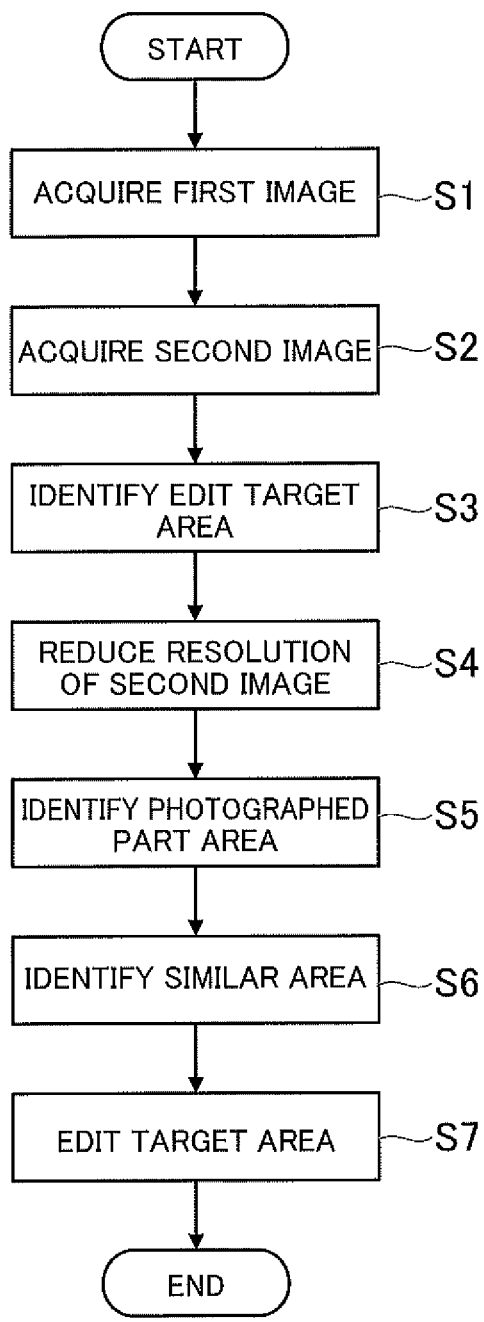
FIG. 12 is a flowchart of one example of the processing executed in an image processing device.

FIG. 12 is a flowchart of one example of the processing executed in the image processing device 10. The processing shown in FIG. 12 is executed by the control unit 11, based on the program stored in the storage unit 12. The processing described below is one example of the processing executed by the functional blocks shown in FIG. 5.

As shown in FIG. 12, the control unit 11 initially acquires the first image $I_{1H}$ and the second image $I_{2H}$ (S1, S2). The first image $I_{1H}$ and the second image $I_{2H}$ may be stored in the storage unit 12 or a memory in the camera 20. Alternatively, the first image $I_{1H}$ and the second image $I_{2H}$ may be stored in an information storage medium connected to the image processing device 10 or in a server computer, or the like.

The control unit 11 then identifies an edit target area, or an area showing the shadow $S_1$, in the first image $I_{1H}$ (S3). At S3, the control unit 11 may identify the shadow $S_1$, or the edit target area, based on a user selection or image analysis, as described above.

The control unit 11 decreases the resolution of the second image $I_{2H}$ so as to match with the first image $I_{1H}$ (S4). At S4, the control unit 11 repeats perspective conversion and projection conversion until the difference in characteristic points of the shadow $S_3$ shown in the first image $I_{1H}$ and those of the shadow $S_3$ shown in the second image $I_{2L}$ becomes less than a threshold, as described above.

The control unit 11 identifies a photographed part area $B_n$ in the low-resolution second image I*t for every pixel $p_n$ ($x_n$, $y_n$) for showing the shadow $S_1$ (S5). At S5, the control unit 11 overlaps the first image $I_{1H}$ and the low-resolution second image $I_{2L}$ to identify an area having a predetermined shape and containing the same coordinates as those of the pixel $p_n$ ($x_n$, $y_n$) that is an edit target small area as a photographed part area $B_n$ for the pixel $p_n$ ($x_n$, $y_n$), as described above. As there are the n number of edit target small areas here, the control unit 11 identifies the n number of photographed part areas $B_n$.

The control unit 11 identifies a similar area $C_n$ in the first image $I_{1H}$ for every photographed part area $B_n$ identified at S5 (S6). At S6, the control unit 11 divides the first image $I_{1H}$ into a plurality of small areas, and identifies a similar area $C_n$, based on the evaluation value $E_{H1R}$ indicating similarity to the pixel values in the photographed part area $B_n$, as described above. As there are the n number of edit target small areas here, the control unit 11 identifies the n number of similar areas $C_n$.

The control unit 11 edits the edit target area (the shadow $S_1$ here) in the first image $I_{1H}$, based on the similar area $C_n$ identified at S6, and the process ends. At S7, the control unit 11 changes the pixel values of the pixels in the edit target area to the pixel values in the similar area $C_n$, as described above. As there are the n number of edit target small areas here, the control unit 11 changes the pixel values of each of the edit target small areas, based on a corresponding one of the n number of similar areas $C_n$.

According to the image processing device 10 described above, as a similar area $C_n$ is searched for in the high-resolution first image $I_{1H}$ to edit the shadow $S_1$, or the edit target area, unnaturalness due to the difference in resolution can be eliminated, and the accuracy in restoration of the shadow part 34 can be improved. In this embodiment, for example, as the photographed part area $B_n$ is identified in the low-resolution second image $I_{2L}$, pasting a low-resolution image intact on the high-resolution first image $I_{1H}$ results in unnatural appearance of the shadow part 34, if shown in the photographed part area $B_n$. In other words, for example, a low-resolution image may not show details or accurate change in color of a photographed image, compared to a high-resolution image (for example, a low-resolution image is blurred as a whole and shows only more moderate change in color than actual change, whereas a high-resolution image shows clear change in color). Therefore, pasting a low-resolution image on a high-resolution first image $I_{1H}$ results in unnatural. Regarding this point, a similar area $C_n$ is searched for in the high-resolution first image $I_{1H}$ to change the color of the shadow $S_1$, or the edit target area, as in this embodiment, an edited part can clearly show the details and accurate change in color of photographed objects. This enables natural restoration of the shadow part 34. Furthermore, searching the entire first image $I_{1H}$ for a similar area $C_n$ may lead to detection of a pattern, if any, similar to that of the shadow part 34 and present at a remote position from the shadow $S_1$ in the first image $I_{1H}$ to use in restoration. Still furthermore, as the resolution of the second image $I_{2H}$ is decreased so as to match with the photographed objects shown in the first image $I_{1H}$, a photographed part area $B_n$ showing the shadow part 34 can be more accurately identified.

Yet furthermore, as the edit target area is divided into a plurality of edit target small areas and each edit target small area is edited based on the corresponding similar area $C_n$, similarity in color can be determined in much smaller units to change the color of the shadow $S_1$. This can enhance the accuracy in restoration of the shadow part 34.

Yet furthermore, as each pixel $p_n$ $(x_n, y_n)$ for showing the shadow $S_1$ is used as an edit target small area, similarity in color can be determined more finely. This can further enhance the accuracy in restoration of the shadow part 34.

[5. Modified Example]

The present invention is not limited to the above described embodiment, and can be desirably modified without departing from the gist of the present invention.

Figure 13:
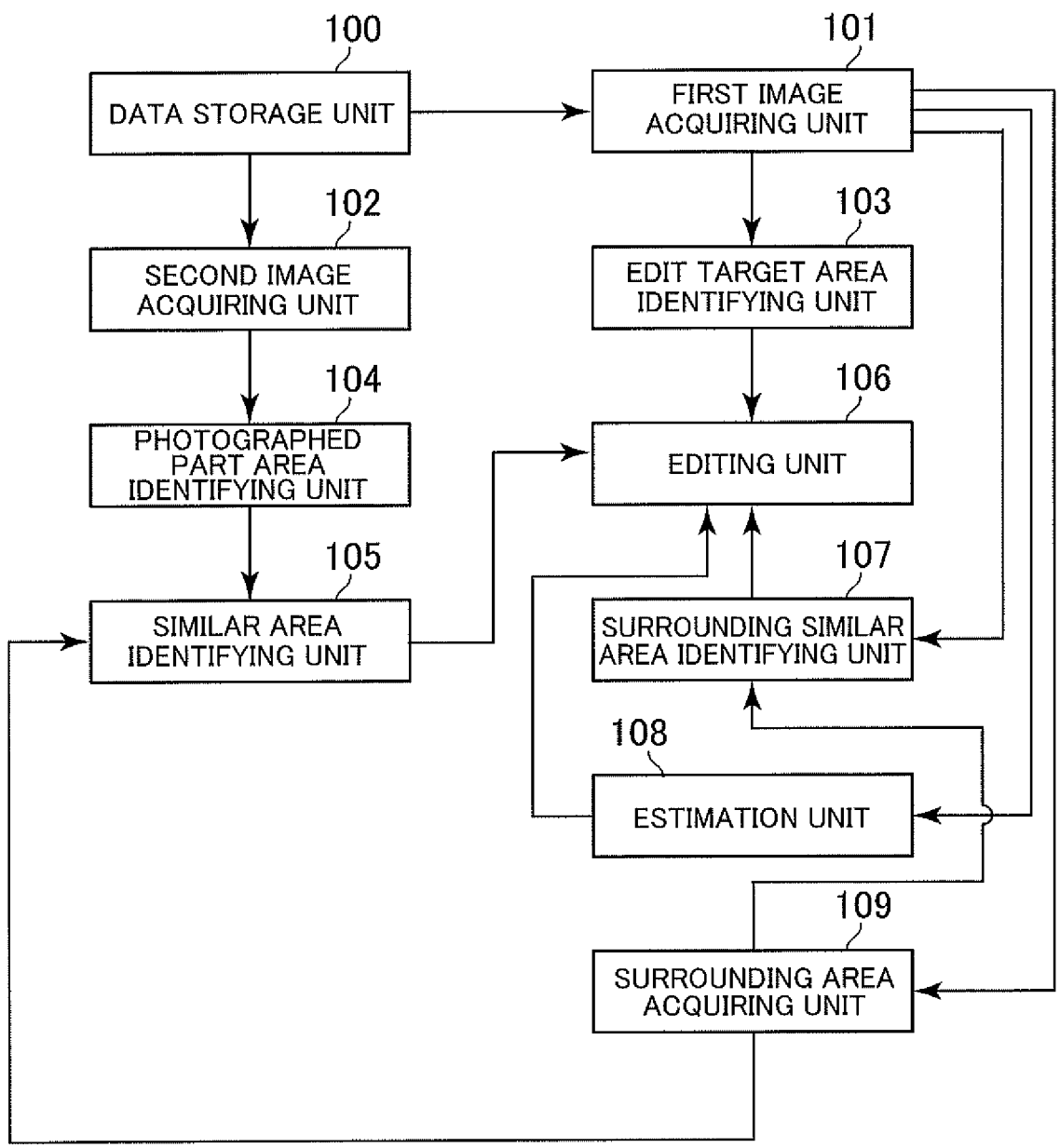
FIG. 13 is a functional block diagram showing the functions implemented in a modified example.

FIG. 13 is a functional block diagram showing functions implemented in a modified example. As shown in FIG. 13, in the modified examples described below, a surrounding similar area identifying unit 107, an estimation unit 108, and a surrounding area acquiring unit 109 are implemented, using mainly the control unit 11. The image processing device 10 does not necessarily have all of these.

(1) For example, in the case where the photographed part area $B_n$ is identified based on the low-resolution second image $I_{2L}$, as described in the above embodiment, in order to increase the accuracy in matching, the resolution of the first image $I_{1H}$ may be decreased to a resolution substantially the same as the resolution of the second image $I_{2L}$ and the similar area $C_n$ is searched for in the low-resolution first image $I_{1L}$.

Specifically, the similar area identifying unit 105 in the modified example (1) decreases the resolution of the first image $I_{1H}$ so as to coincide with the resolution of the low-resolution second image $I_{2L}$. For example, the similar area identifying unit 105 may decrease the resolution of the first image $I_{1H}$ to a resolution same as the resolution of the second image $I_{2L}$ or a resolution different from the resolution of the second image $I_{2L}$ by an amount less than a threshold if not exactly the same. As a method for decreasing the resolution of an image, any publicly known resolution conversion method is applicable.

Figure 14:
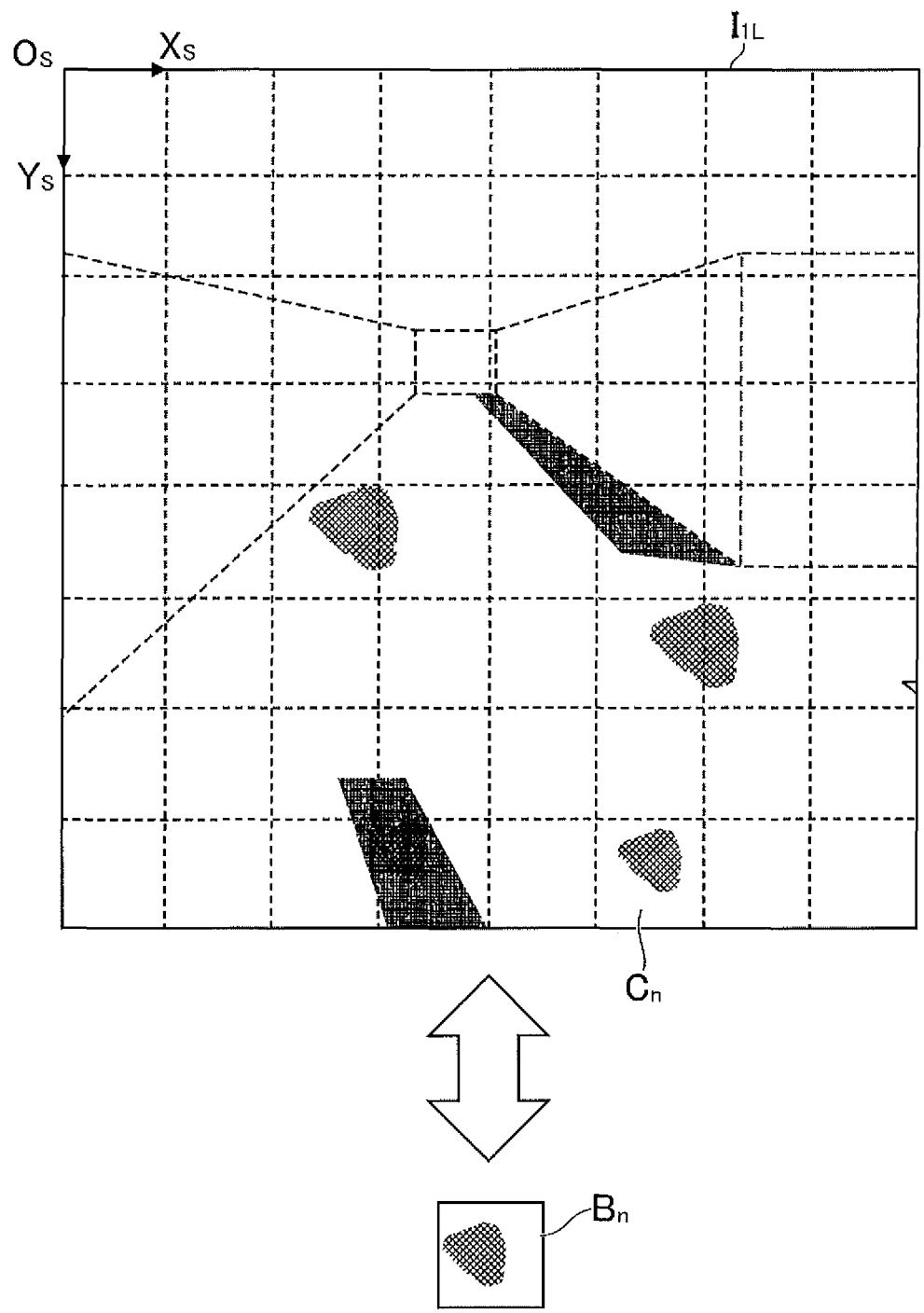
FIG. 14 is a diagram showing a low-resolution first image.

FIG. 14 shows the low-resolution first image $I_{1L}$. In FIG. 14, the low-resolution image is schematically indicated by a broken line, similar to FIG. 7. As shown in FIG. 14, the low-resolution first image $I_{1L}$ is as blurred as the low-resolution second image $I_{2L}$. The similar area identifying unit 105 decreases the resolution of the first image $I_{1H}$ to thereby generate a first image $I_{1L}$ showing the photographed objects entirely blurred.

The similar area identifying unit 105 in this modified example identifies an area in the low-resolution first image $I_{1L}$ similar to the photographed part area $B_n$ as a similar area $C_n$. That is, an area in the first image $I_{1L}$ same as an area similar to the photographed part area $B_n$ in the low-resolution first image $I_{1L}$ may be identified as a similar area $C_n$. The method itself for identifying the area that is similar may be similar to that which is described in the embodiment. That is, the similar area identifying unit 105 may execute template matching using the photographed part area $B_n$ as a template image to identify a similar area $C_n$. In this case, for example, the similar area identifying unit 105 divides the first image $I_{1L}$ into a plurality of small areas each having a size same as, or similar to, that of the photographed part area $B_n$, and calculates an evaluation value $E_{L1R}$ indicating similarity, based on the pixel values in each small area and those in the photographed part area $B_n$. Calculation of the evaluation value $E_{L1R}$ may use an expression similar to the expression 1 described in the embodiment.

In editing the edit target area, the editing unit 106 uses the pixel values of the similar area $C_n$ in the high-resolution first image $I_{1H}$ here, with the low-resolution first image $I_{1H}$ used only to identify the similar area $C_n$, although the editing unit 106 may use the pixel values of the similar area $C_n$ in the low-resolution first image $I_{1L}$. Specifically, the editing unit 106 edits, based on the pixel values of the similar area $C_n$ in the first image $I_{1H}$ whose resolution is yet to be decreased. That is, the editing unit 106 edits, using the pixel values of the pixels in the first image $I_{1H}$ at the same coordinates as those of the similar area $C_n$ that is identified using the low-resolution first image $I_{1L}$. The method itself used by the editing unit 106 to edit based on the pixel values of the similar area $C_n$ may be similar to the method described in the embodiment.

According to the modified example (1), as the similar area $C_n$ is searched for in the first image $I_{1L}$ whose resolution has been decreased to substantially the same as that of the low-resolution second image $I_{2L}$, more accurate identification of an area similar to the shadow part 34 is achieved. This improve the accuracy in restoration of the shadow part 34.

Although use of the pixel values in the low-resolution first image $I_{1L}$ can improve the accuracy in restoration of the shadow part 34 to some extent, use of the pixel values in the high-resolution first image $I_{1H}$ in editing can eliminate unnaturalness due to the difference in resolution. This can enhance the accuracy in restoration of the shadow part 34.

(2) For example, as a pattern similar to that of the shadow pattern 34 may possibly exist around the shadow $S_1$ shown in the first image $I_{1H}$, similarity to the photographed part area $B_n$ and similarity to the pattern around the shadow $S_1$ may be comprehensively taken into consideration when identifying a similar area $C_n$.

That is, the similar area identifying unit 105 according to this modified example identifies a similar area $C_n$ similar to the photographed part area $B_n$ and also to the surrounding area $A_n$ containing the shadow in the first image $I_{1H}$. The surrounding area $A_n$ is an area containing the pixels within a predetermined distance from the pixels for showing the shadow $S_1$, as described above. The surrounding area $A_n$, which may have any shape, is square here, although the surrounding area $A_n$ may have any other shape, such as a rectangle or a round. The size of the surrounding area $A_n$, which may be desirably set, is the same as that of the small area obtained by dividing the first image $I_{1H}$ here. As the shadow $S_1$ is formed on the shadow part 34, which is a part of the road 32, the surrounding area $A_n$ is a part showing parts of the road 32 around that part.

Figure 15:
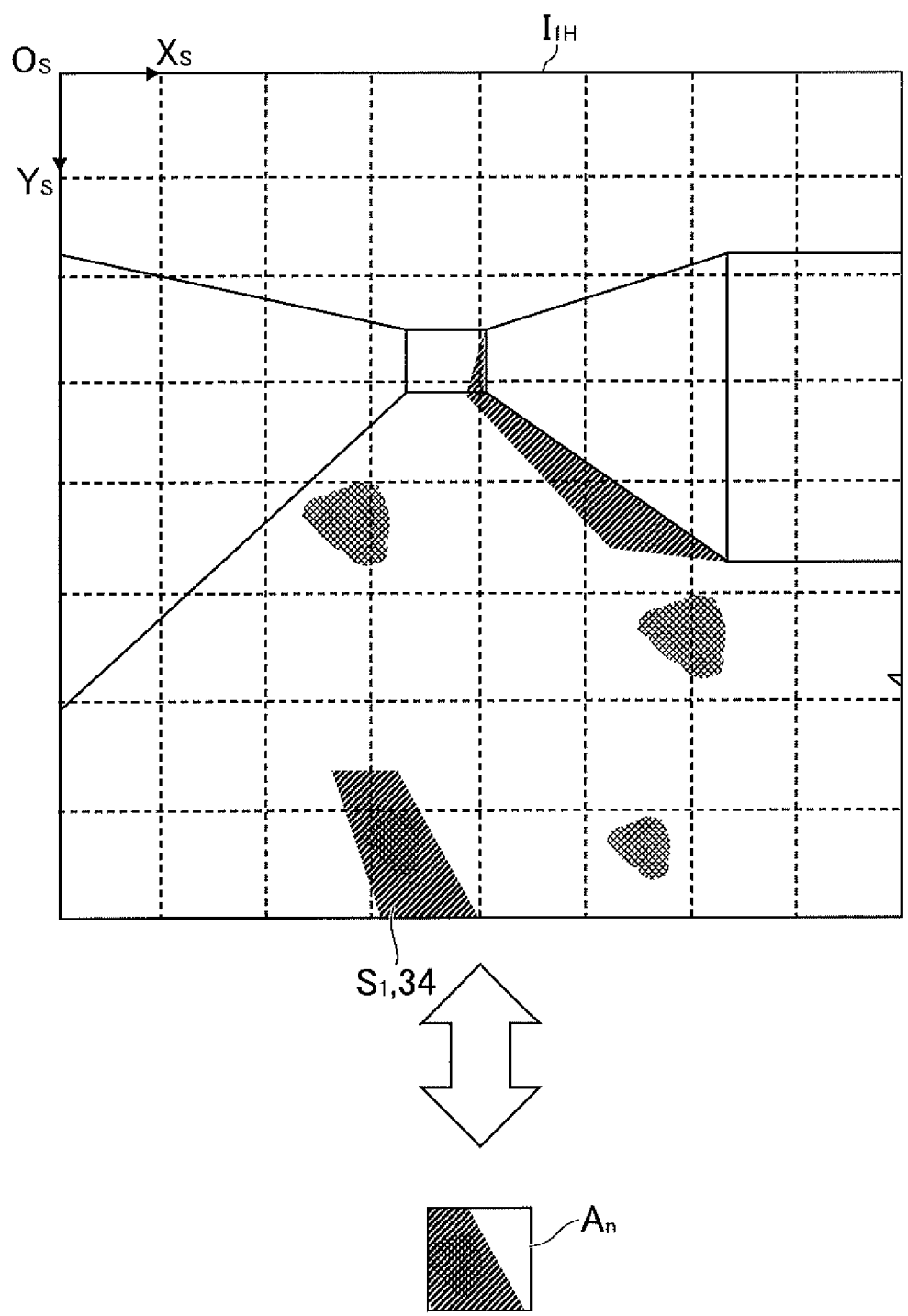
FIG. 15 is a diagram showing a method for identifying a similar area in a modified example (2).

FIG. 15 shows a method for identifying a similar area $C_n$ in the modified example (2). The similar area identifying unit 105 initially identifies a surrounding area $A_n$ in the first image $I_{1H}$, based on operation by a user or through image analysis. For example, to identify a surrounding area $A_n$ based on operation by a user, the similar area identifying unit 105 displays the first image $I_{1H}$ on the display unit 15 to receive operation by a user. For example, a user selects a surrounding area $A_n$ so as to contain a part or the entirety of the shadow $S_1$ by operating the operation unit 14. In this case, the similar area identifying unit 105 identifies a surrounding area $A_n$, based on the area selected by the user. Meanwhile, to identify a surrounding area $A_n$, based on image analysis, for example, the similar area identifying unit 105 may identify the shadow $S_1$, using a method similar to that which is used to identify an edit target area, and further identify a surrounding area $A_n$ so as to contain a part or the entirety of the shadow $S_1$. Note that a small area containing the shadow $S_1$ may be excluded from search targets.

The similar area identifying unit 105 then calculates an evaluation value $E_{H1A}$ indicating similarity, based on the pixel values in each small area in the first image $I_{1H}$ and those in the surrounding area $A_n$. The evaluation value $E_{H1A}$ may be calculated based on the difference between these pixel values, and may use an expression similar to the expression 1 described in the embodiment.

The similar area identifying unit 105 thereafter identifies a similar area $C_n$, based on the evaluation value $E_{H1R}$ indicating similarity to the photographed part area $B_n$ and the evaluation value $E_{H1A}$ indicating similarity to the surrounding area $A_n$. For example, the similar area identifying unit 105 identifies a small area with the smallest sum of the evaluation value $E_{H1R}$ and the evaluation value $E_{H1A}$ (that is, a small area with E=argmin ($E_{H1R}+E_{H1A}$), or a small area with high comprehensive similarity) as a similar area $C_n$. Alternatively, a small area may be selected, using a value calculated by weighting by a predetermined factor, rather than the sum of the evaluation values. Still alternatively, a small area may be selected using the average of these evaluation values. That is, a similar area $C_n$ may be identified, based on comprehensive similarity to the photographed part area $B_n$ and the surrounding area $A_n$.

According to the modified example (2), as a similar area $C_n$ is identified in additional consideration of the similarity to the surrounding area $A_n$, an area similar to the shadow part 34 can be detected, utilizing information on the condition around the shadow $S_1$. This can enhance the accuracy in restoration of the shadow part 34.

(3) Although a case has been described in the modified example (2) in which, for example, one similar area $C_n$ is identified based on comprehensive similarity to the photographed part area $B_n$ and the surrounding area $A_n$, an area similar to the photographed part area $B_n$ and an area similar to the surrounding area $A_n$ may be separately identified to edit the shadow $S_1$, or the edit target area, based on the pixel values in these two areas.

The image processing device 10 according to this modified example includes the surrounding similar area identifying unit 107. The surrounding similar area identifying unit 107 identifies a surrounding similar area $C_{nA}$ similar to the surrounding area $A_n$ containing the shadow $S_1$ in the first image $I_{1H}$, based on at least one of the first image $I_{1H}$ and the second image $I_{2H}$. Although a case is described here in which the surrounding similar area identifying unit 107 identifies a surrounding similar area $C_{nA}$ in the first image $I_{1H}$, the surrounding similar area identifying unit 107 may identify a surrounding similar area $C_{nA}$ in an image obtained by editing the first image $I_{1H}$ (for example, the low-resolution first image $I_{1L}$).

The method itself for identifying the area that is similar may be similar to that which is used in identification of a similar area $C_n$. That is, the surrounding similar area identifying unit 107 may execute template matching, using the surrounding area $A_n$ as a template image, to thereby identify a surrounding similar area $C_{nA}$. For example, the surrounding similar area identifying unit 107 identifies a small area with the evaluation value $E_{H1A}$, indicative of similarity to the surrounding area $A_n$, being the highest or less than a threshold as a surrounding similar area $C_{nA}$.

The editing unit 106 edits, based further on the surrounding similar area $C_{nA}$. That is, the editing unit 106 edits, based on the similar area $C_n$ and the surrounding similar area $C_{nA}$. For example, the editing unit 106 may compare the evaluation value $E_{H1R}$ of the similar area $C_n$ and the evaluation value $E_{H1A}$ a of the surrounding similar area $C_{nA}$, and edit the edit target area, based on the one with the lower value (that is the one with higher similarity). An editing method employed when the similar area $C_n$ has higher similarity than the surrounding similar area $C_{nA}$ is the same as is described in the embodiment. Meanwhile, when the surrounding similar area $C_{nA}$ has higher similarity than the similar area $C_n$, the editing unit 106 may change the pixel values in the edit target area, based on the pixel values in the surrounding similar area $C_{nA}$.

Alternatively, for example, the editing unit 106 may substitute the pixel values in the similar area $C_n$ and those in the surrounding similar area $C_{nA}$ into a predetermined expression to determine the obtained pixel values as the pixel values in the shadow $S_1$, or the edit target area. That is, these two kinds of pixel values may be mixed to therewith fill the shadow $S_1$. The expression may be any predetermined expression, for example, one for a simple average or a weighted average. For a weighted average, a factor may be determined based on the value of an evaluation value.

According to the modified example (3), as the edit target area is edited in consideration of not only the pixel values of the similar area $C_n$ but also those in the surrounding similar area $C_{nA}$, the shadow part 34 can be restored based on more information. This can enhance the accuracy in restoration of the shadow part 34.

(4) For example, the shadow $S_1$ shown in the first image $I_{1H}$ may not be all black, and some features of the shadow part 34 may possibly be shown. Thus, the color of the shadow part 34 may be estimated, based on the color of the shadow $S_1$, to edit the edit target area, based not only on the similar area $C_n$ but also on the result of estimation.

The image processing device 10 according to the modified example (4) includes the estimation unit 108. The estimation unit 108 estimates the shadow part 34 in the space 30, based on the condition around the shadow $S_1$ in the first image $I_{1H}$. For example, the estimation unit 108 estimates the color of the shadow part 34, based on the pixel values of the pixels for showing the shadow $S_1$ in the first image $I_{1H}$ and those of the pixels around those pixels.

Figure 16:
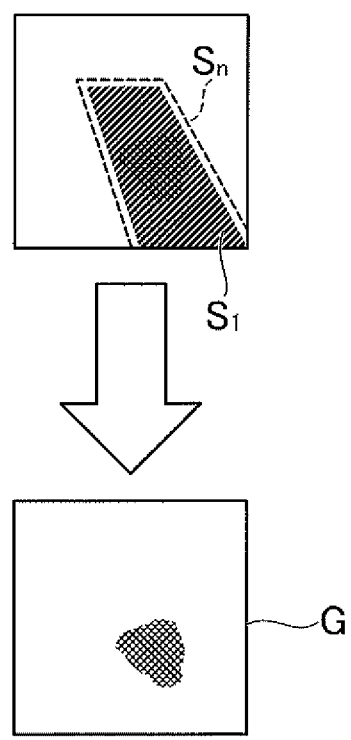
FIG. 16 is a diagram showing an estimation method for estimating a shadow part.

FIG. 16 shows a method for estimating the shadow part 34. As shown in FIG. 16, the estimation unit 108 identifies the shadow $S_1$ in the first image $I_{1H}$, using a method similar to that which is used by the edit target area identifying unit 103, and obtains the color of the pixels around the shadow $S_1$. Although the estimation unit 108 may identify a surrounding area $A_n$, as in the modified example (2), the estimation unit 108 acquires the color of the pixels adjacent to the shadow $S_1$ here. For example, assuming that the pixel value indicating the original color of the shadow part 34 is defined as O, the base color of the shadow $S_1$ (for example, black) is defined as T, and the transparency is defined as r ($0 \le r \le 1$), the pixel value X of each of the pixels in the shadow $S_1$ can be defined by the expression 2 below.

$$X = O(1-r) + rT \quad \text{[Expression 2]}$$

Assume here that the original color (the color without the shadow $S_1$, or the original color of the shadow part 34) of a pixel in a peripheral part of the shadow $S_1$ is the same as the color of a pixel in an adjacent area $S_n$ adjacent to that pixel. Further, assume that the transparency of the pixels for showing the shadow $S_1$ is common to all those pixels. With these assumptions, the estimation unit 108 initially calculates the transparency r, based on the pixel values in the adjacent area $S_n$, and then calculates the pixel values O, using the pixel value X of each pixel, based on the transparency r, to thereby generate an estimated image G showing the result of estimation of the color of the shadow part 34. A method for generating the estimated image G is not limited to the above described example, and the estimated image G may be generated, based on the pixel values of the pixels for showing the shadow $S_1$ and those of the pixels around the pixels.

The editing unit 106 edits, based further on the result of estimation by the estimation unit 108. That is, the editing unit 106 edits, based on the similar area $C_n$ and the color (the pixel values of the estimated image G) of the shadow part 34 estimated by the estimation unit 108. For example, the editing unit 106 substitutes the pixel values in the similar area $C_n$ and the color of the shadow part 34 estimated by the estimation unit 108 into a predetermined expression to define the obtained pixel values as the pixel values in the edit target area. The expression may be any predetermined expression, for example, one for a simple average or a weighted average. For a weighted average, a factor may be determined in advance.

According to the modified example (4), as the edit target area is edited, using not only the pixel values in the similar area $C_n$ but also the result of estimation for the shadow part 34, the accuracy in restoration of the shadow part 34 can be enhanced (5) For example, the result of estimation in the modified example (4) may be used as the surrounding area $A_n$ used in the modifies examples (2) and (3). Specifically, the shadow part 34 is estimated as in the modified example (4), and used as the surrounding area An, while the condition around the shadow $S_1$ shown in the first image $I_{1H}$ is not used intact as the surrounding area An.

The image processing device 10 in the modified example (5) includes the surrounding area acquiring unit 109. The surrounding area acquiring unit 109 acquires a surrounding area $A_n$, based on the result of estimation by the estimation unit 108. The surrounding area acquiring unit 109 acquires the surrounding area $A_n$, based on the pixel values of an image edited by the estimation unit 108. In this case, the surrounding area acquiring unit 109 acquires a part or the entirety of the estimated image G as a surrounding area $A_n$. That is, the surrounding area $A_n$ may be an area having a predetermined shape and containing the pixel $p_n$ ($x_n$, $y_n$) as the center thereof in the estimated image G. A method for identifying an area similar to the surrounding area $A_n$ is similar to the method described in the respective modified examples.

In the modified example (5), as a surrounding area $A_n$ is acquired, utilizing the result of estimation for the shadow part 34, the accuracy in restoration of the shadow part 34 can be enhanced.

(6) For example, although a case has been described in the above embodiment and modified examples in which the similar area identifying unit 105 identifies a similar area $C_n$, based on the first image $I_{1H}$, the similar area identifying unit 105 may search for an area similar to the photographed part area $B_n$, or the like, based on the second image $I_{2H}$ as described above. That is, the similar area identifying unit 105 may search for an area similar to the photographed part area $B_n$, or the like, based on at least one of the first image $I_{1H}$ and the second image $I_{2H}$ (for example, in the high-resolution first image $I_{1H}$ and the high-resolution second image $I_{2H}$ or in the low-resolution first image $I_{1L}$ and the low-resolution second image $I_{2L}$). For distinction, an area identified based on the first image $I_{1H}$ will be hereinafter referred to as a first similar area $C_{n1}$, and an area identified based on the second image $I_{2H}$ as a second similar area $C_{n2}$. The second similar area $C_{n2}$ may be searched for for every pixel $p_n$ ($x_n$, $y_n$) that is an edit target small area, similar to the first similar area $C_{n1}$.

For example, the similar area identifying unit 105 may identify a second similar area $C_{n2}$ similar to the photographed part area $B_n$, based on the second image $I_{2H}$. This identification method itself may be similar to the method described with respect to the first similar area $C_{n1}$. That is, the similar area identifying unit 105 executes template matching, using the photographed part area $B_n$ as a template image, to thereby identify a second similar area $C_{n2}$. For example, the similar area identifying unit 105 divides the second image $I_{2H}$ into a plurality of small areas each having the same size as that of the photographed part area $B_n$, and calculates an evaluation value $E_{H2R}$ indicating similarity, based on the pixel values in each small area and those in the photographed part area $B_n$. Calculation of the evaluation value $E_{H2R}$ may use an expression similar to that which is described in the embodiment, and may be based on a difference in pixel value.

The editing unit 106 may edit, based on the second similar area $C_{n2}$. For example, the editing unit 106 may edit, based on both the first similar area $C_{n1}$ and the second similar area $C_{n2}$. For example, the editing unit 106 may substitute the pixel values in the first similar area $C_{n1}$ and those in the second similar area $C_{n2}$ into a predetermined expression to determine the obtained pixel values as the pixel values in the edit target area. That is, these two kinds of pixel values may be mixed to therewith fill the shadow $S_1$. This expression may be any predetermined expression, for example, one for a simple average or a weighted average. For a weighted average, a factor may be determined based on the value of an evaluation value.

For example, the editing unit 106 may select either one of the first similar area $C_{n1}$ and the second similar area $C_{n2}$ to edit. For example, the editing unit 106 may compare the evaluation value $E_{H1R}$ of the first similar area $C_{n1}$ and the evaluation value $E_{H2R}$ of the second similar area $C_{n2}$ to edit the edit target area, based on the one with a lower evaluation value (that is, one with higher similarity). An editing method employed when the first similar area $C_{n1}$ has higher similarity than the second similar area $C_{n2}$ is the same as is described in the embodiment. Meanwhile, when the second similar area $C_{n2}$ has higher similarity than the first similar area $C_{n1}$, the editing unit 106 may change the pixel values in the edit target area, based on the pixel values in the second similar area $C_{n2}$.

For example, when the similar area identifying unit 105 identifies only a second similar area $C_{n2}$, while omitting identifying a first similar area $C_{n1}$, the editing unit 106 may edit, based on the second similar area $C_{n2}$. In this case, the editing unit 106 changes the pixel values of the pixels $p_n(x_n, y_n)$ in the shadow $S_1$, or the edit target area, based on the second similar area $C_{n2}$.

According to the modified example (6), considering the pixel values of the second similar area $C_{n2}$ based on the high-resolution second image $I_{2H}$ can improve the accuracy in restoration of the shadow part 34. For example, when both the first similar area $C_{n1}$ and the second similar area $C_{n2}$ are used, the shadow part 34 can be restored, based on more information. This can enhance the accuracy in restoration of the shadow part 34.

(7) For example, with the modified examples (2) and (6) combined, the similar area identifying unit 105 may identify a second similar area $C_{n2}$ similar to the photographed part area $B_n$ and the surrounding area $A_n$, based on the second image $I_{2H}$. A method for identifying a second similar area $C_{n2}$ may be similar to that which is described in the modified example (2). That is, the similar area identifying unit 105 calculates the evaluation value $E_{H2A}$ indicating similarity, based on the pixel values in each small area of the second image $I_{2H}$ and those in the surrounding area $A_n$. That is, calculation of the evaluation value $E_{H2A}$ may be made, based on a difference in pixel value, and may use an expression similar to the expression 1 described in the embodiment.

The similar area identifying unit 105 identifies a second similar area $C_{n2}$, based on the evaluation value $E_{H2P}$ indicating similarity to the photographed part area $B_n$ and the evaluation value $E_{H2A}$ indicating similarity to the surrounding area $A_n$. For example, the similar area identifying unit 105 identifies a small area with the smallest sum of the evaluation value $E_{H2R}$ and the evaluation value $E_{H2A}$ (that is, a small area with high comprehensive similarity) as a second similar area $C_{n2}$. Alternatively, a small area may be selected, using a value calculated by weighting by a predetermined factor, instead of the sum of the evaluation values. Still alternatively, a small area may be selected, using the average of the evaluation values. That is, a second similar area $C_{n2}$ may be identified, based on comprehensive similarity to the photographed part area $B_n$ and to the surrounding area $A_n$.

For example, with the modified examples (3) and (6) combined, the similar area identifying unit 105 may identify a second surrounding similar area $C_{nA}$ similar to the surrounding area $A_n$, based on the second image $I_{2H}$. The method itself for identifying the area that is similar may be similar to that which is described in the modified example (3). That is, the similar area identifying unit 105 may execute template matching, using the surrounding area $A_n$ as a template image, to thereby identify a second surrounding similar area $C_{n2A}$. For example, the similar area identifying unit 105 identifies a small area with the evaluation value $E_{H2A}$, indicating similarity to the surrounding area $A_n$, being the highest or less than a threshold as a second surrounding similar area $C_{n2A}$.

The editing unit 106 may edit, based further on the second surrounding similar area $C_{n2A}$. That is, the editing unit 106 may edit, based on the second similar area $C_{n2}$ and the second surrounding similar area $C_{n2A}$. For example, the editing unit 106 may compare the evaluation value $E_{H2P}$ of the second similar area $C_{n2}$ and the evaluation value $E_{H2A}$ of the second surrounding similar area $C_{n2A}$ to edit the edit target area, based on the one with a lower evaluation value (that is, one with higher similarity). An editing method employed when the second similar area $C_{n2}$ has higher similarity than the second surrounding similar area $C_{n2A}$ is the same as is described in the modified example (3). Meanwhile, when the second surrounding similar area $C_{n2A}$ has higher similarity than the second similar area $C_{n2}$, the editing unit 106 changes the pixel values in the edit target area, based on the pixel values in the second surrounding similar area $C_{n2A}$.

For example, the editing unit 106 may substitute the pixel values in the second similar area $C_{n2}$ and those in the second surrounding similar area $C_{n2A}$ into a predetermined expression to determine the obtained pixel values as the pixel values in the edit target area. That is, these two kinds of pixel values may be mixed to therewith fill the shadow $S_1$. This expression may be any predetermined expression, for example, one for a simple average or a weighted average. For a weighted average, a factor may be determined based on an evaluation value.

For example, with the modified examples (5) and (6) combined, the result of estimation by the estimation unit 108 may be used as a surrounding area $A_n$. That is, a surrounding area $A_n$ may be acquired, based on the estimated image G also in the modified example (7).

According to the modified example (7), as a second similar area $C_{n2}$ is identified in additional consideration of the similarity to the surrounding area $A_n$, an area similar to the shadow part 34 can be detected, using the information on the condition around the shadow $S_1$. This can enhance the accuracy in restoration of the shadow part 34. Additionally, as the edit target area is edited in consideration of not only the pixel values of the second similar area $C_{n2}$ but also those of the second surrounding similar area $C_{n2A}$, the shadow part 34 can be restored based on more information. This can enhance the accuracy in restoration of the shadow part 34.

(8) For example, although restoration of the shadow part 34 has been described as an example in the above described embodiment and modified examples, the image processing device 10 may restore a shielded part shielded by a shielding object. A shielding object is an object that shields another object placed in the space 30 when the other object is viewed from the camera 20. In other words, a shielding object is an object disposed between the object viewed and the camera 20. The object shielded by the shielding object will be hereinafter referred to as a shielded object.

A shielded object is an object that is not seen or hardly seen due to the presence of a shielding object. When the shielded object is a part of the road 32, for example, the shielding object may be a baggage or a plastic bag on the road 32 or a signboard hiding the road 32. The shielding object may be opaque or translucent. The term "shadow" in the description of the embodiment and modified examples may be read as "shielding object", and the term "shadow part" as "shielded part".

For example, the first image $I_{1H}$ may show a picture in which there is a shielding object in a part of the space 30. For example, the second image $I_{2H}$ may show a shielded part in the space 30. For example, the edit target area identifying unit 103 may identify an edit target area showing a shielding object in the first image $I_{1H}$. For example, the photographed part area identifying unit 104 may identify a photographed part area $B_n$ showing a shielded part in the space 30. Similarly in other processing as well, the image processing device 10 may eliminate a shielding object, rather than a shadow, and restore a shielded part, rather than a shadow part. This can improve the accuracy in restoration of a shielded object.

(9) For example, although a case has been described in which each edit target small area corresponds to each pixel, the edit target small area may correspond to a plurality of pixels (for example, 3 pixels×3 pixels). In this case, the numbers of pixels included in respective different edit target small areas may differ from one another. For example, although a case in which the edit target area is divided into edit target small areas has been described, the edit target area may not be particularly divided into a plurality of areas. In this case, the photographed part area identifying unit 104 may identify a single photographed part area corresponding to the entire edit target area, and the similar area identifying unit 105 may identify a single similar area similar to the single photographed part area (for example, a similar area similar to the entire shadow $S_1$). Then, the editing unit 106 may change the color of the entire edit target area, based on the single similar area. In this case, the editing unit 106 may paste the similar area intact on the edit target area (fill the shadow $S_1$ at once with the similar area similar to the entire shadow $S_1$) or changes the pixel values of the edit target area to closer to the pixel values of the similar area.

For example, the second position $P_2$ may not be farther from the shadow part or the shielded part than the first position $P_1$. The second position $P_2$ may be a position from where an image of the shadow part or the shielded part can be captured, and may be closer to the shadow part or the shielded part than the first position $P_1$ or as far as the first position $P_1$ from the shadow part or the shielded part. In this case, the photographing direction $V_2$ for photographing at the second position $P_2$ may differ from the photographing direction $V_1$ for photographing at the first position $P_1$. That is, having been captured at a different angle from that of the first image $I_{2H}$, the second image $I_{2H}$ may show the shadow part or the shielded part. In this case, perspective conversion and projection conversion may be applied taking the difference in angle into consideration when identifying the photographed part area $B_n$.

For example, the first image $I_{1H}$ and the second image $I_{2H}$ may be a cube map that can be generated based on an image captured on an omnidirectional camera. For example, the first image $I_{1H}$ and the second image $I_{2H}$ may not be square, but be rectangular or of any other shape. The first image $I_{1H}$ and the second image $I_{2H}$ may not be color images but may be gray scale images or monochrome images. There may be two or more shadow parts or shielded parts to be restored rather than one. When an image includes a plurality of shadow parts or shielded parts, some or all of the parts included may be restored.

(10) For example, although a case has been described in the above described embodiment and modified examples in which the image processing device 10 changes the pixel values of the edit target, based on the similar area detected in the high-resolution first image or second image, if unnaturalness due to a low-resolution image is tolerable to some extent, the image processing device 10 may detect a similar area in the low-resolution first image or second image and change the pixel values of the edit target area, based on the pixel values of the low-resolution image. For example, whereas a conventional method uses only the first image to restore a shielded part, the image processing device 10 according to the modified example uses the second image or the low-resolution second image. Such a use can possibly improve the accuracy in restoration, compared to the conventional method. The image processing device 10 may therefore identify a similar area in at least one of the low-resolution first image and the low-resolution second image, and change the pixel values of the edit target area, based on the pixel values of the low-resolution image.

For example, the image processing device 10 may change the pixel values of the edit target area, based on the photographed part area in the high-resolution or low-resolution second image, without particularly identifying a similar area. This as well can possibly improve the accuracy in restoration, compared to the conventional method that uses only the first image. That is, the similar area identifying unit 105 is omissible. In this case, the editing unit 106 edits the edit target area, based on the photographed part area. The method itself for editing the edit target area, based on the pixel values in the area may be similar to that which is described in the embodiment. For example, the editing unit 106 may change the pixel values of the edit target area to the pixel values same as those of the photographed part area or closer to the pixel values, if not exactly the same, of the photographed part area.

The invention claimed is:

1. An image processing device, comprising at least one processor configured to:
   acquire a first image photographed from a first position which shows a picture containing a first shadow or a first shielding object;
   acquire a second image photographed from a second position which shows a second shadow part or a second shielded part in a space shown in the first image, wherein a second distance between the second position and the second shadow part or the second shielded part is greater than a first distance between the first position and the second shadow part or the second shielded part;
   identify an edit target area where the first shadow or the first shielding object is shown in the first image;
   decrease a resolution of the second image so as to match with the space shown in the first image, and identify a photographed part area where the second shadowed part or the second shielded part is shown in a low-resolution second image;
   identify a similar area in the first image, the similar area being similar to the photographed part area; and
   edit the edit target area in the first image, based on the similar area.

2. The image processing device according to claim 1, wherein the at least one processor is further configured to decrease a resolution of the first image so as to coincide with a resolution of the low-resolution second image, and identifies an area in a low-resolution first image similar to the photographed part area as the similar area.

3. The image processing device according to claim 2, wherein the at least one processor is further configured to edit, based on pixel values of the similar area in the first image of which resolution is yet to be decreased.

4. The image processing device according to claim 1, wherein the at least one processor is further configured to identify an area similar to the photographed part area and a surrounding area including the first shadow or the first shielding object in the first image as the similar area.

5. The image processing device according to claim 1, wherein the at least one processor is further configured to:
  identify a surrounding similar area in the first image, the surrounding similar area being similar to a surrounding area including the first shadow or the first shielding object in the first image; and
  edit the edit target area based further on the surrounding similar area.

6. The image processing device according to claim 1, wherein the at least one processor is further configured to:
  estimate a color of the second shadow part or the second shielded part in the space, based on a condition around the first shadow or the first shielding object that is translucent shown in the first image; and
  edit the edit target area based further on the estimated color.

7. The image processing device according to claim 4, wherein the at least one processor is further configured to:
  estimate a color of the second shadow part or the second shielded part in the space, based on a condition around the first shadow or the first shielding object that is translucent shown in the first image; and
  acquire the surrounding area based on the estimated color.

8. The image processing device according to claim 1, wherein the edit target area comprises a plurality of smaller areas; and wherein the at least one processor is further configured to;
  identify a plurality of the photographed part areas corresponding to the plurality of respective smaller areas;
  identify a plurality of the similar areas similar to the plurality of respective photographed part areas; and
  edit each of the plurality of smaller areas, based on the similar area similar to a corresponding photographed part area.

9. The image processing device according to claim 8, wherein the smaller area corresponds to a pixel or a plurality of pixels for showing the first shadow or the first shielding object in the first image.

10. An image processing method, comprising:
  acquiring a first image photographed from a first position which shows a picture containing a first shadow or a first shielding object;
  acquiring a second image photographed from a second position which shows a second shadow part or a second shielded part in a space shown in the first image, wherein a second distance between the second position and the second shadow part or the second shielded part is greater than a first distance between the first position and the second shadow part or the second shielded part;
  identify an edit target area in the first image where the first shadow or the first shielding object is shown in the first image;
  decreasing a resolution of the second image so as to match with the space shown in the first image, and identify a photographed part area where the second shadowed part or the second shielded part is shown in a low-resolution second image;
  identify a similar area in the first image, the similar area being similar to the photographed part area; and
  edit the edit target area in the first image, based on the similar area.

11. A non-transitory computer-readable information storage medium for storing a program for causing a computer to:
  acquire a first image photographed from a first position which shows a picture containing a first shadow or a first shielding object;
  acquire a second image photographed from a second position which shows a second shadow part or a second shielded part in a space shown in the first image, wherein a second distance between the second position and the second shadow part or the second shielded part is greater than a first distance between the first position and the second shadow part or the second shielded part;
  identify an edit target area where the first shadow or the first shielding object is shown in the first image;
  decrease a resolution of the second image so as to match with the space in the first image, and identify a photographed part area where the second shadowed part or the second shielded part is shown in a low-resolution second image;
  identify a similar area in the first image, the similar area being similar to the photographed part area; and
  edit the edit target area in the first image, based on the similar area.

12. The image processing device according to claim 1, wherein the at least one processor is further configured to:
  calculate an evaluation value indicating similarity between small areas in the at least one of the first image and the second image and the photographed part area; and
  identify the similar area based on the evaluation value.

13. The image processing device according to claim 1, wherein the similar area is within the first image and is separate from the edit target area.

* * * * *